(12) United States Patent
Sasaki et al.

(10) Patent No.: US 7,054,104 B2
(45) Date of Patent: May 30, 2006

(54) MAGNETIC HEAD WITH HELICAL COIL AND PLURAL OUTER CONDUCTOR GROUPS AND METHOD OF MANUFACTURING SAME

(75) Inventors: Yoshitaka Sasaki, Milpitas, CA (US); Takehiro Kamigama, Kwai Chung (HK); Hiroyuki Ito, Milpitas, CA (US)

(73) Assignees: Headway Technologies, Inc., Milpitas, CA (US); SAE Magnetics (H.K.) Ltd., Shatin (CN)

( * ) Notice: Subject to any disclaimer, the term of this patent is extended or adjusted under 35 U.S.C. 154(b) by 191 days.

(21) Appl. No.: 10/692,731

(22) Filed: Oct. 27, 2003

(65) Prior Publication Data

US 2005/0088780 A1    Apr. 28, 2005

(51) Int. Cl.
*G11B 5/17*    (2006.01)

(52) U.S. Cl. ...................................................... 360/123
(58) Field of Classification Search ................. 360/123
See application file for complete search history.

(56) References Cited

U.S. PATENT DOCUMENTS

| | | | |
|---|---|---|---|
| 5,995,342 A | 11/1999 | Cohen et al. | 360/126 |
| 6,043,959 A | 3/2000 | Crue et al. | 360/317 |
| 6,191,916 B1 | 2/2001 | Sasaki | 360/126 |
| 6,459,543 B1 | 10/2002 | Sasaki | 360/126 |
| 6,778,354 B1* | 8/2004 | Matono | 360/123 |
| 2002/0176205 A1* | 11/2002 | Matono | 360/126 |
| 2004/0196590 A1* | 10/2004 | Sasaki et al. | 360/126 |
| 2004/0212922 A1* | 10/2004 | Sasaki et al. | 360/123 |

FOREIGN PATENT DOCUMENTS

| | | | |
|---|---|---|---|
| JP | 5-250636 A | * | 9/1993 |
| JP | A 2000-311311 | | 11/2000 |
| JP | A 2003-282324 | | 10/2003 |
| JP | A 2003-297632 | | 10/2003 |

* cited by examiner

*Primary Examiner*—Jefferson Evans
(74) *Attorney, Agent, or Firm*—Oliff & Berridge, PLC

(57) ABSTRACT

The magnetic head in accordance with the present invention comprises first and second magnetic pole layers, a link part for magnetically linking the first and second magnetic pole layers, and a thin-film coil helically wound about at least one of the first and second magnetic pole layers. The thin-film coil comprises a plurality of inner conductor parts arranged in parallel with each other with an insulating film interposed therebetween, a plurality of first outer conductor parts located on the side of the first or second magnetic pole layer opposite from the side where the inner conductor parts are located, a plurality of second outer conductor parts located on the side of the first outer conductor parts opposite from the side where the inner conductor parts are located, and a plurality of connecting parts for connecting their corresponding inner conductor parts and first and second outer conductor parts.

19 Claims, 32 Drawing Sheets

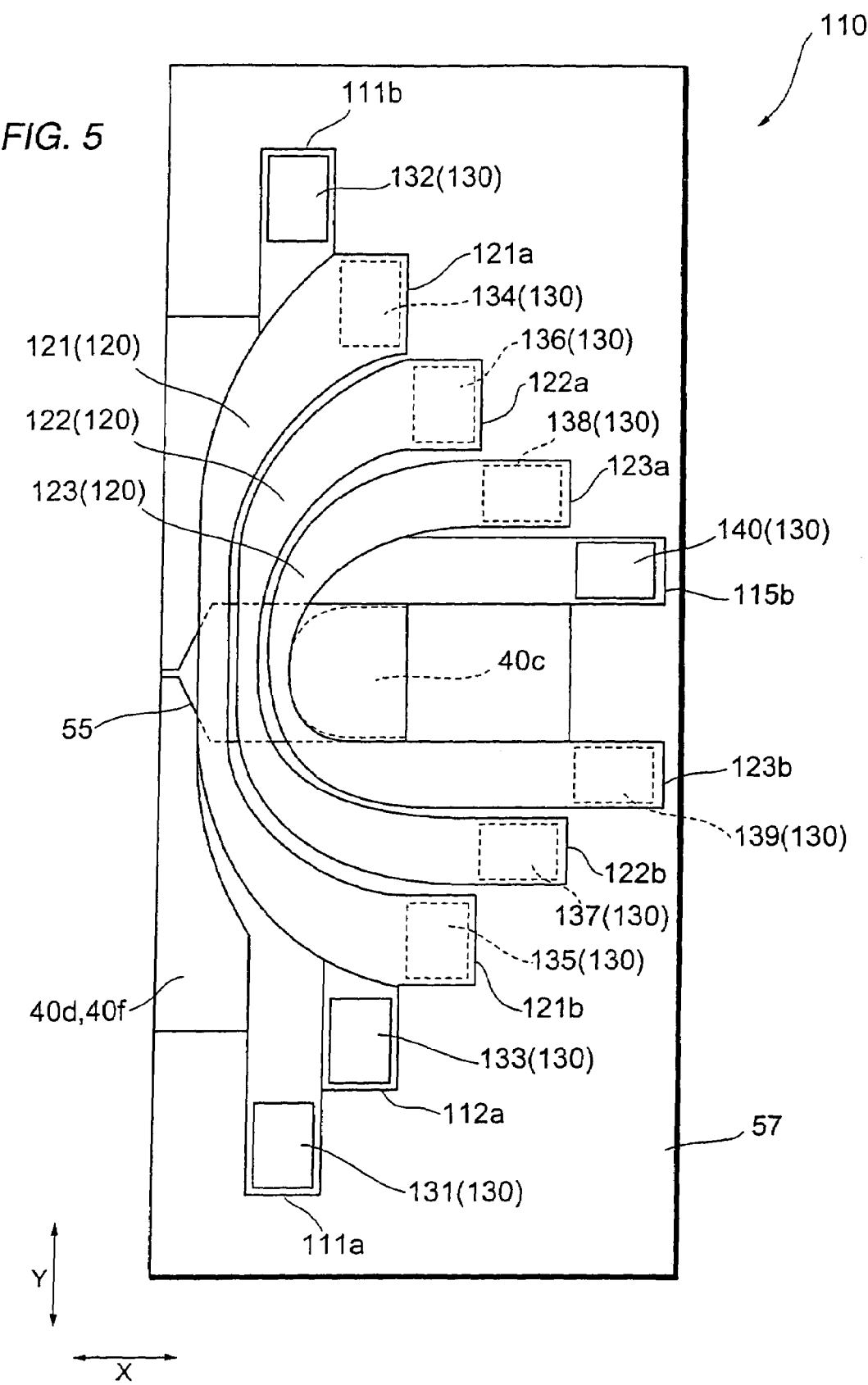

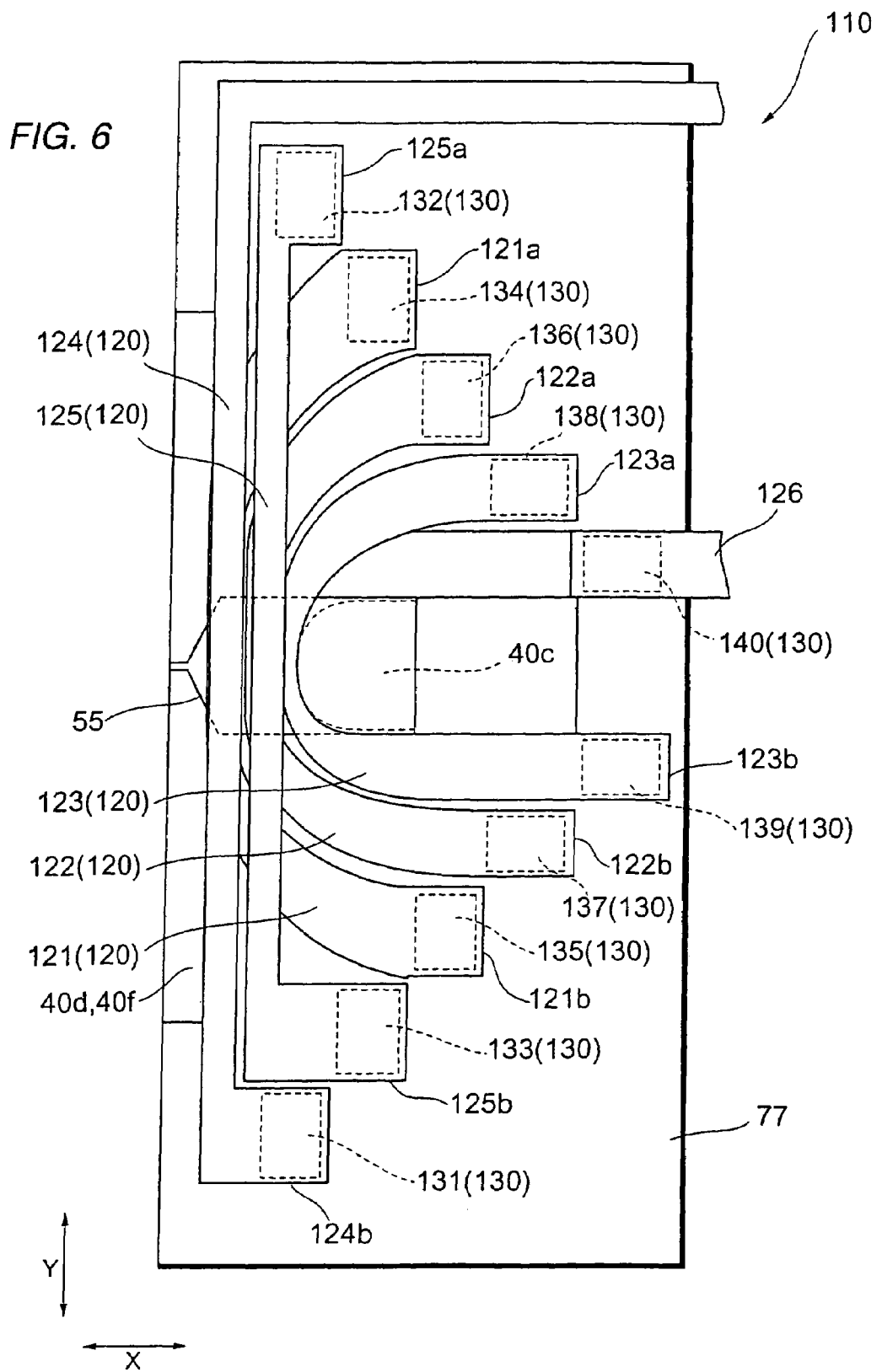

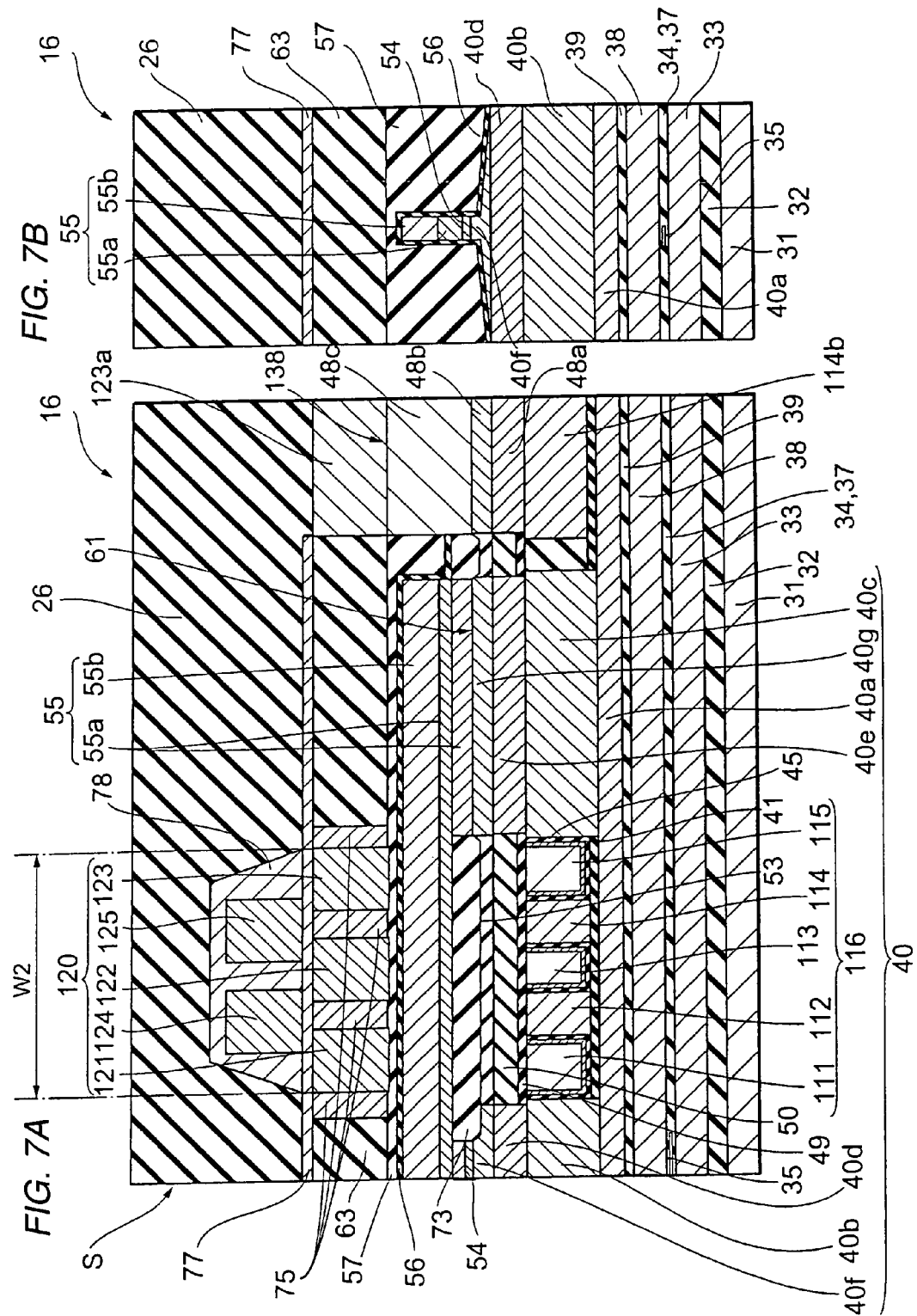

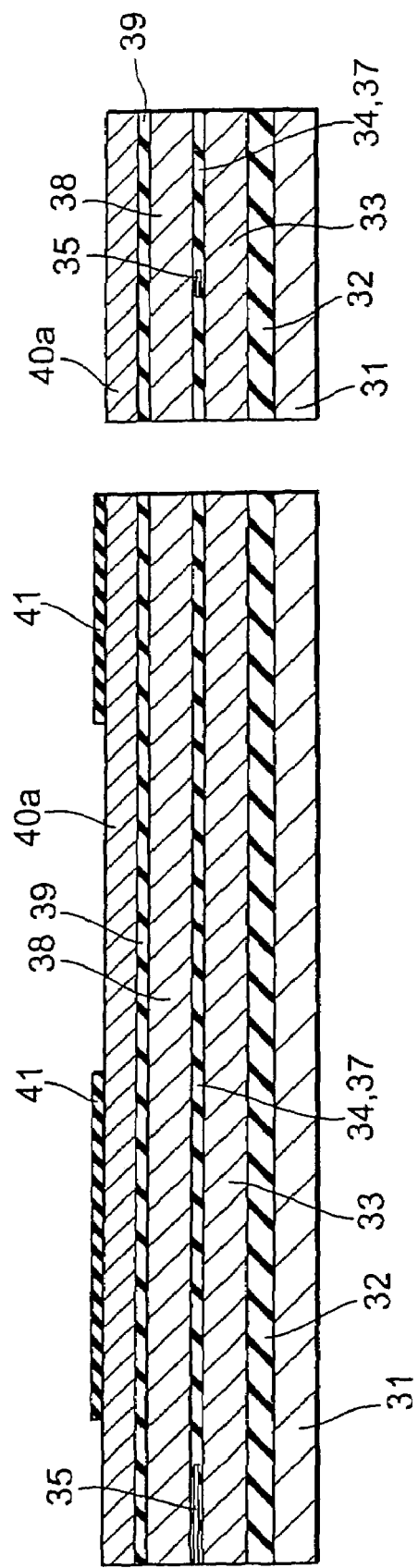

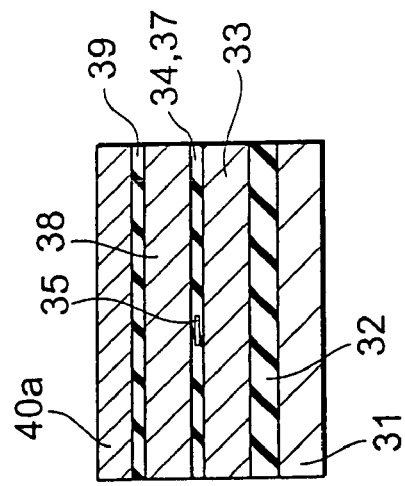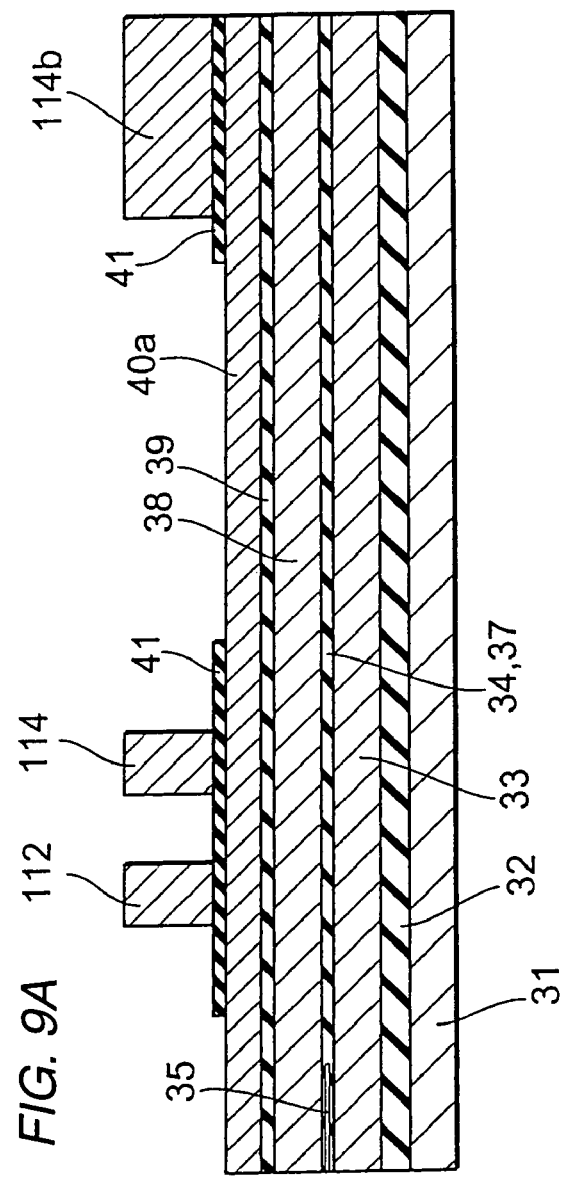

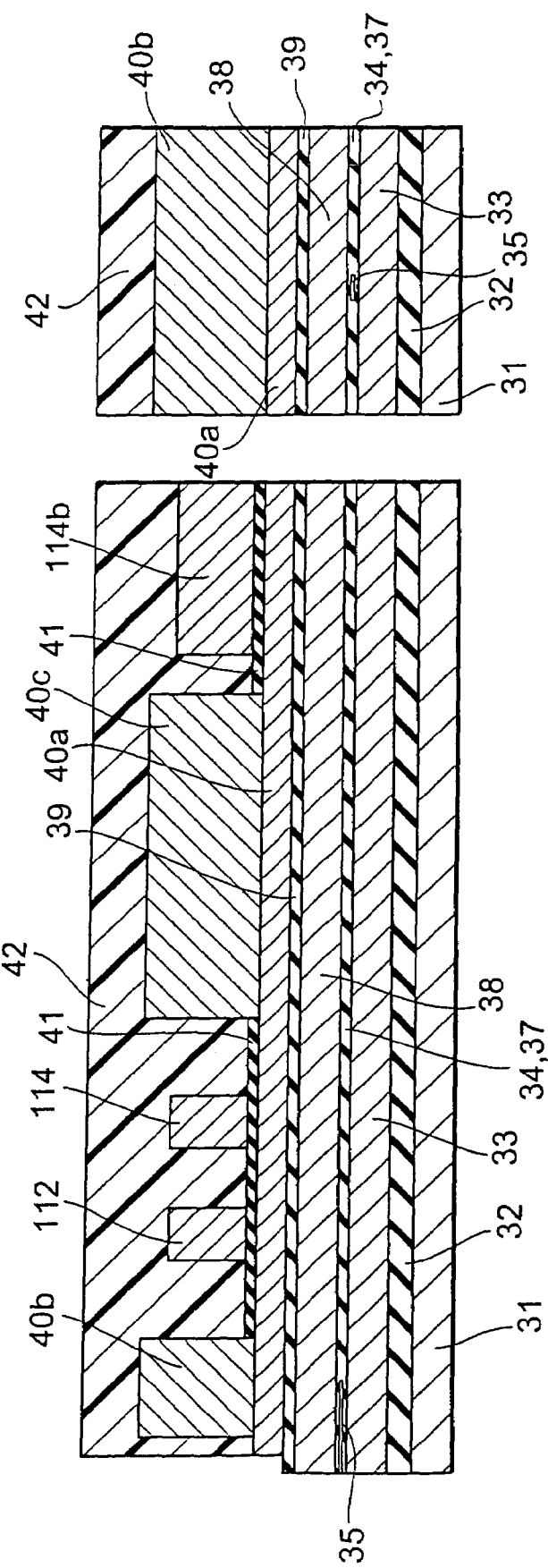
FIG. 11A / FIG. 11B

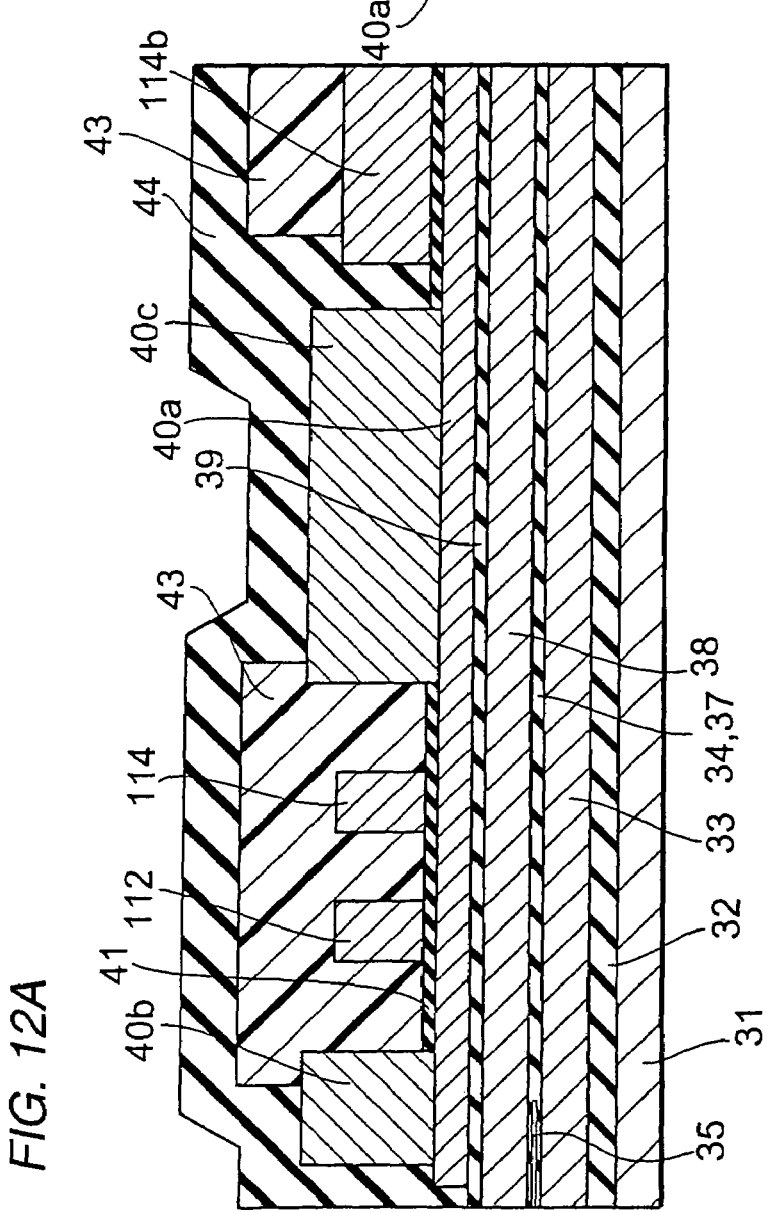

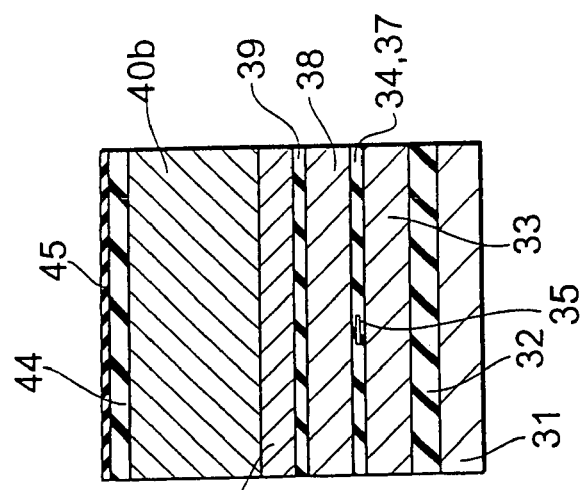
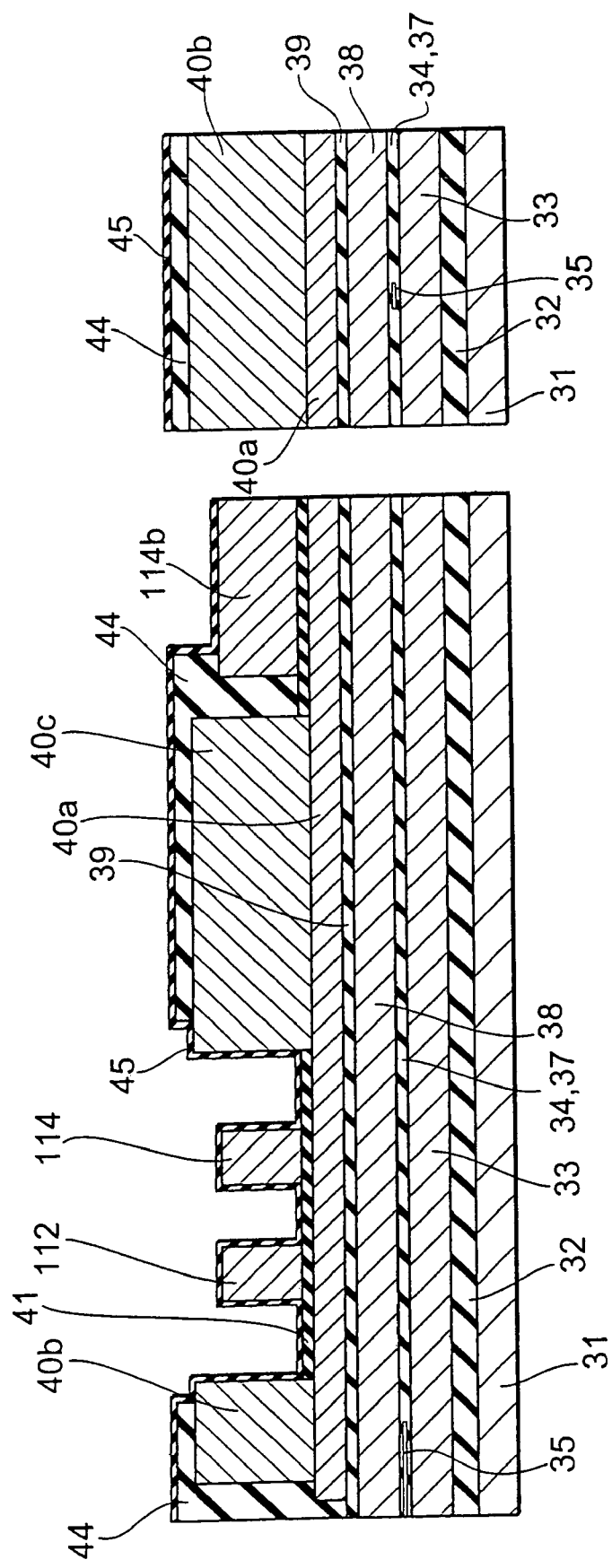
FIG. 13A
FIG. 13B

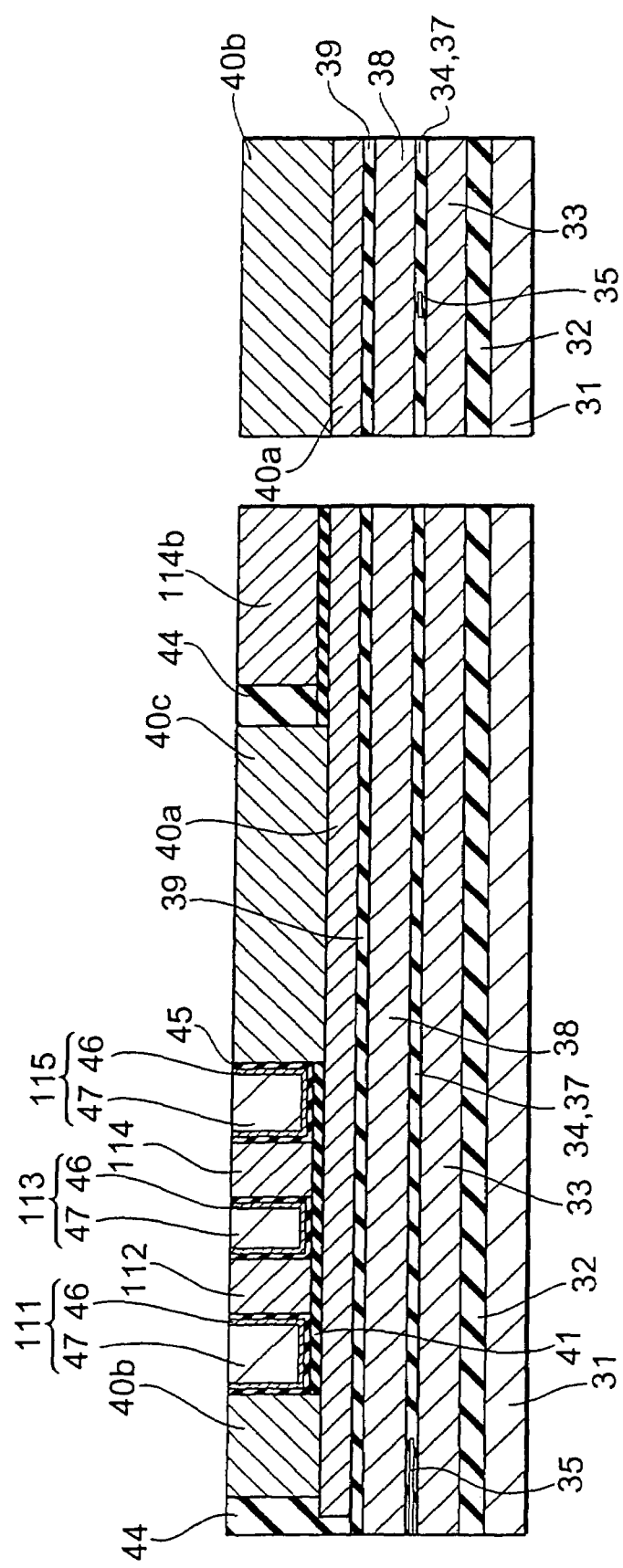

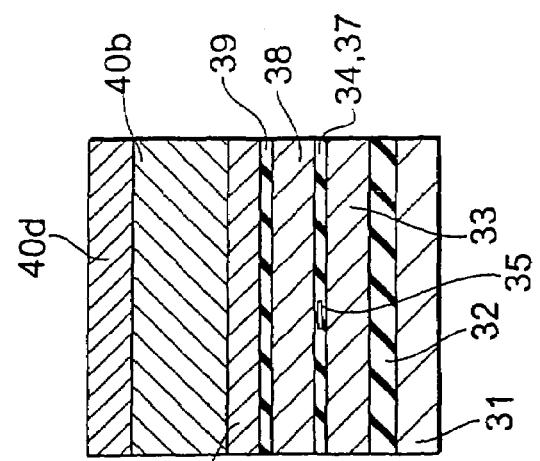
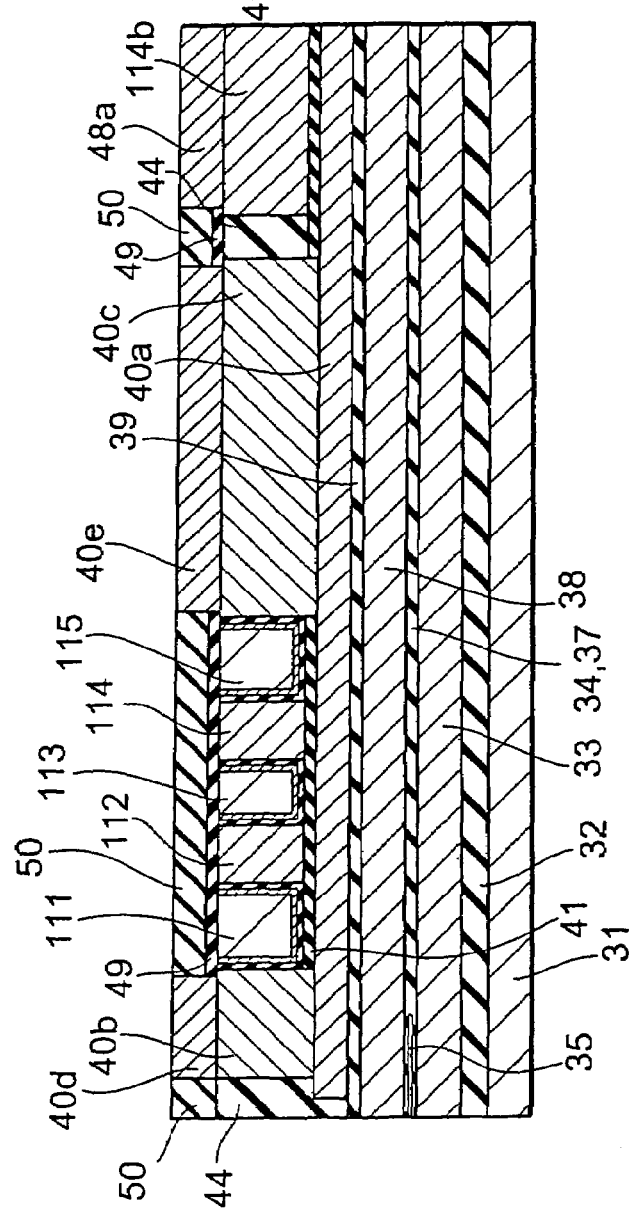
FIG. 16A
FIG. 16B

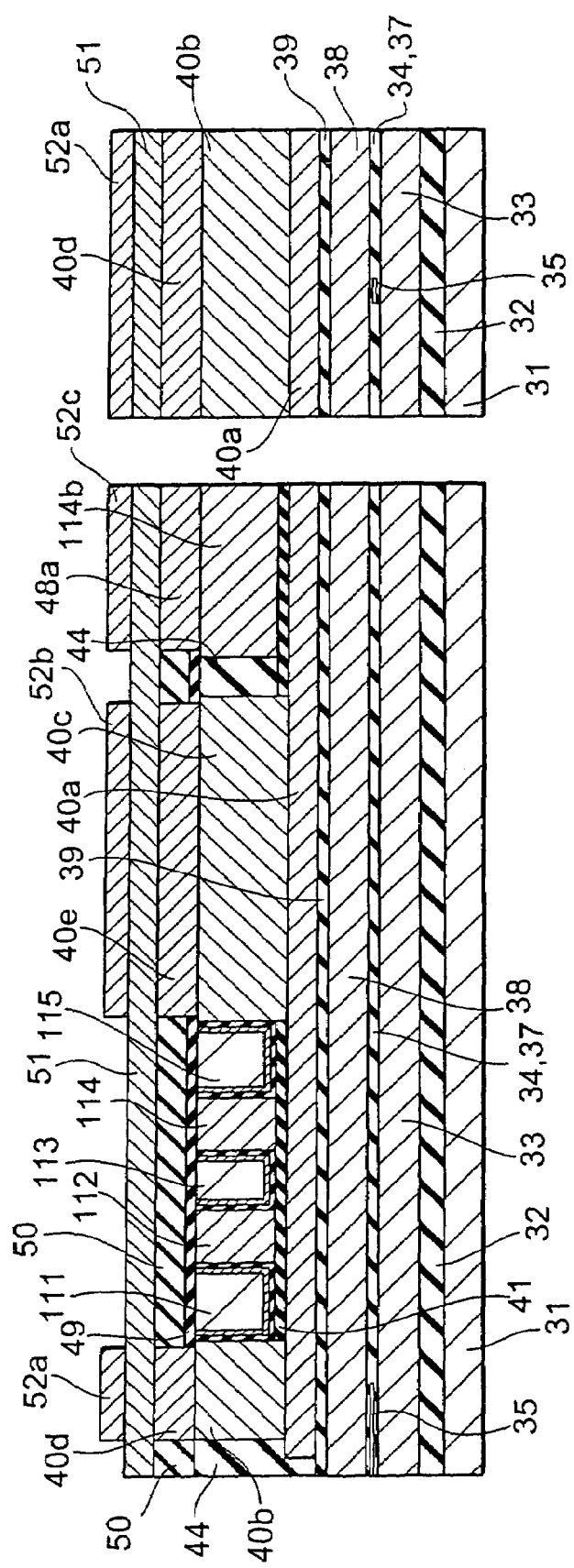

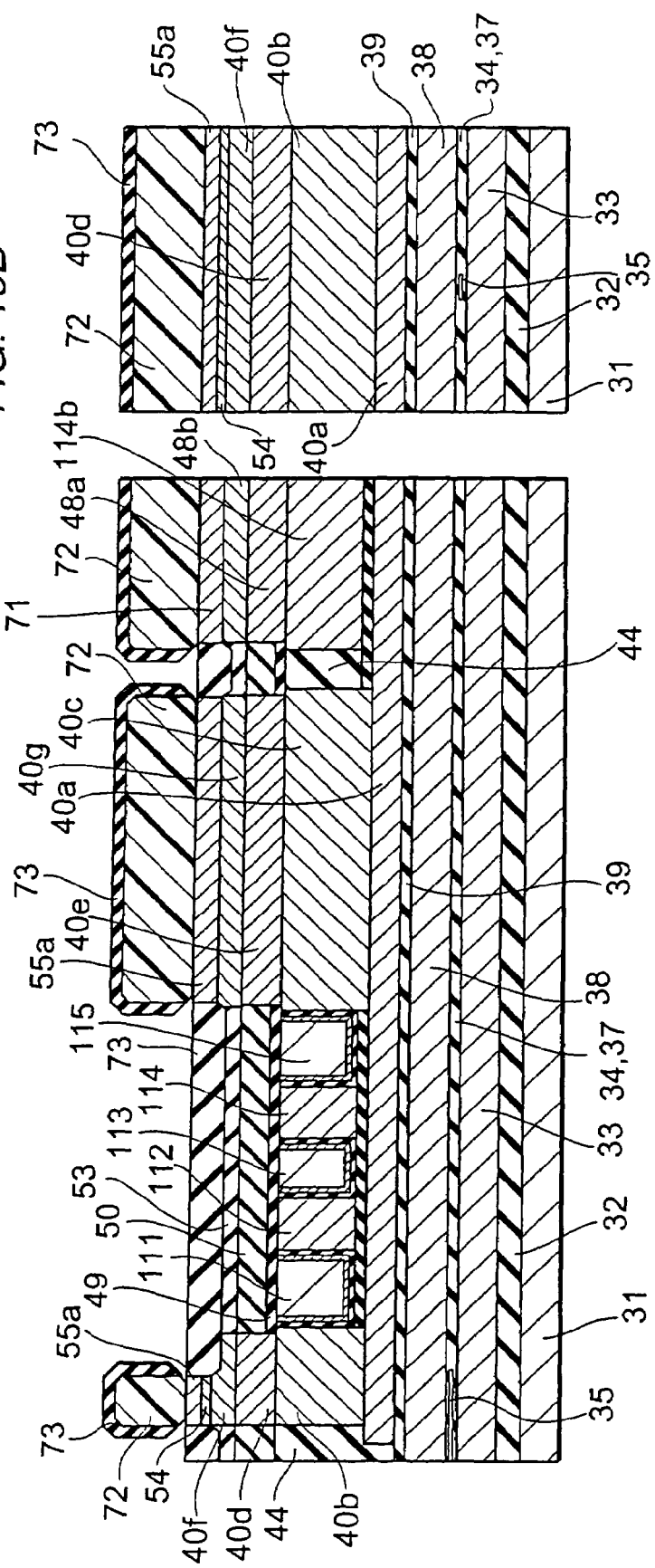

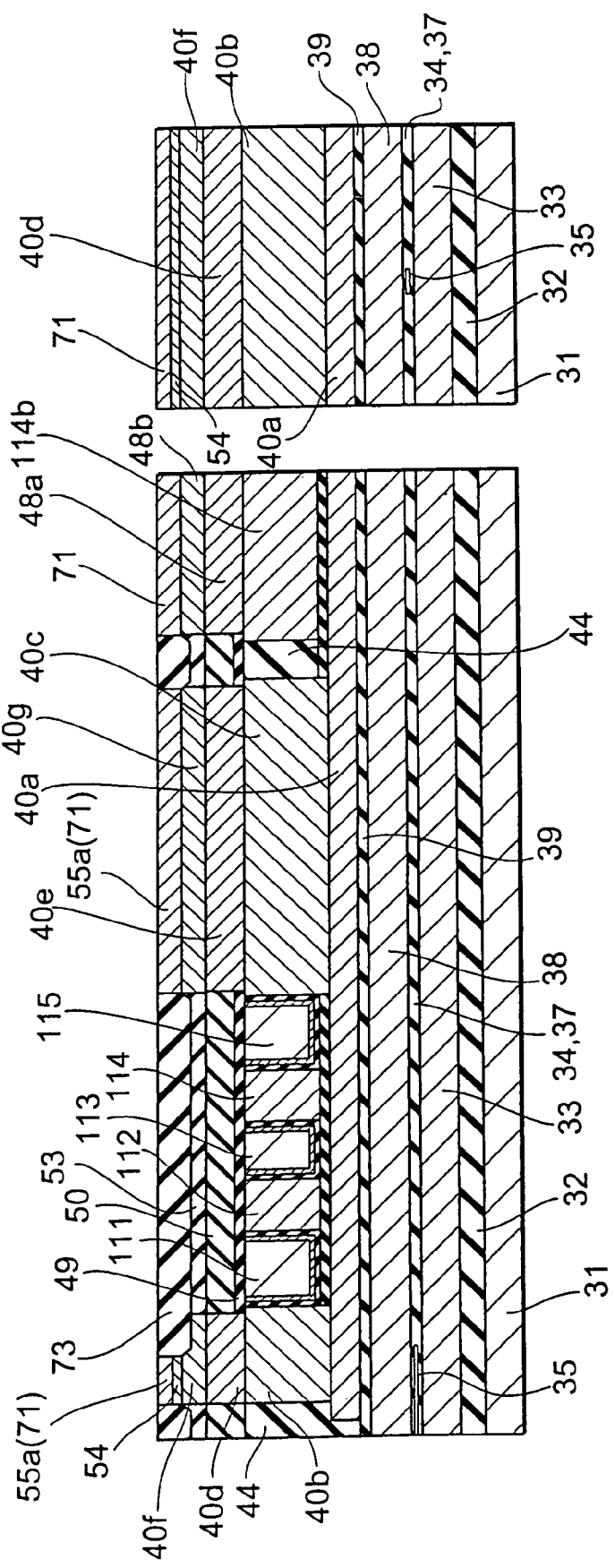

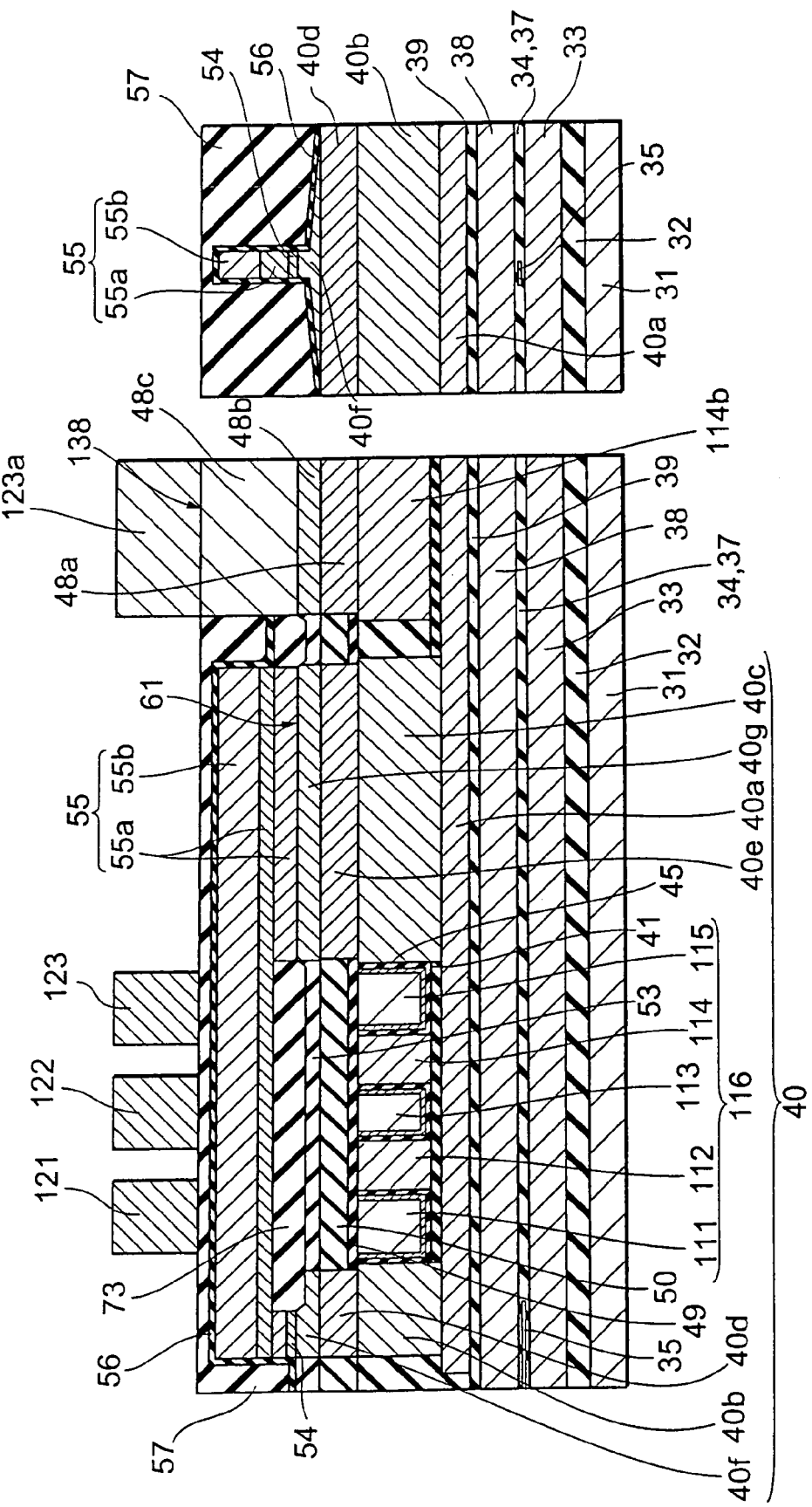

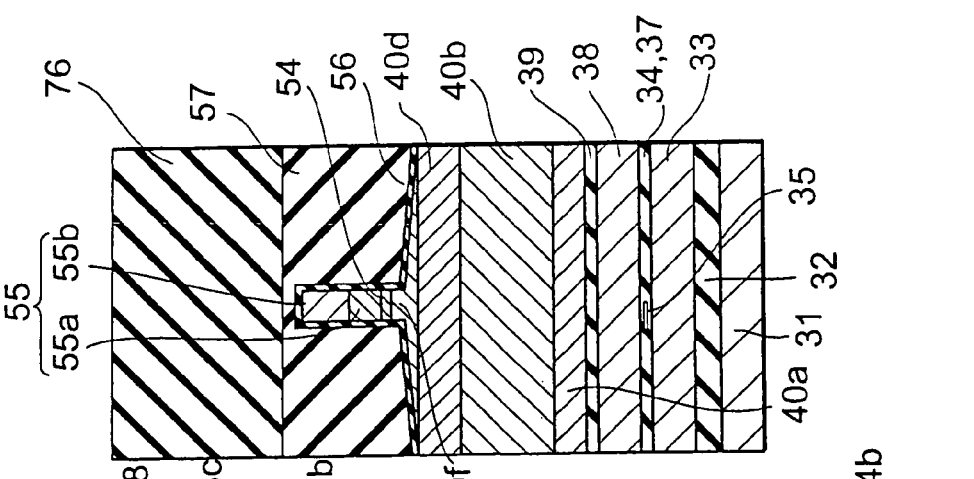
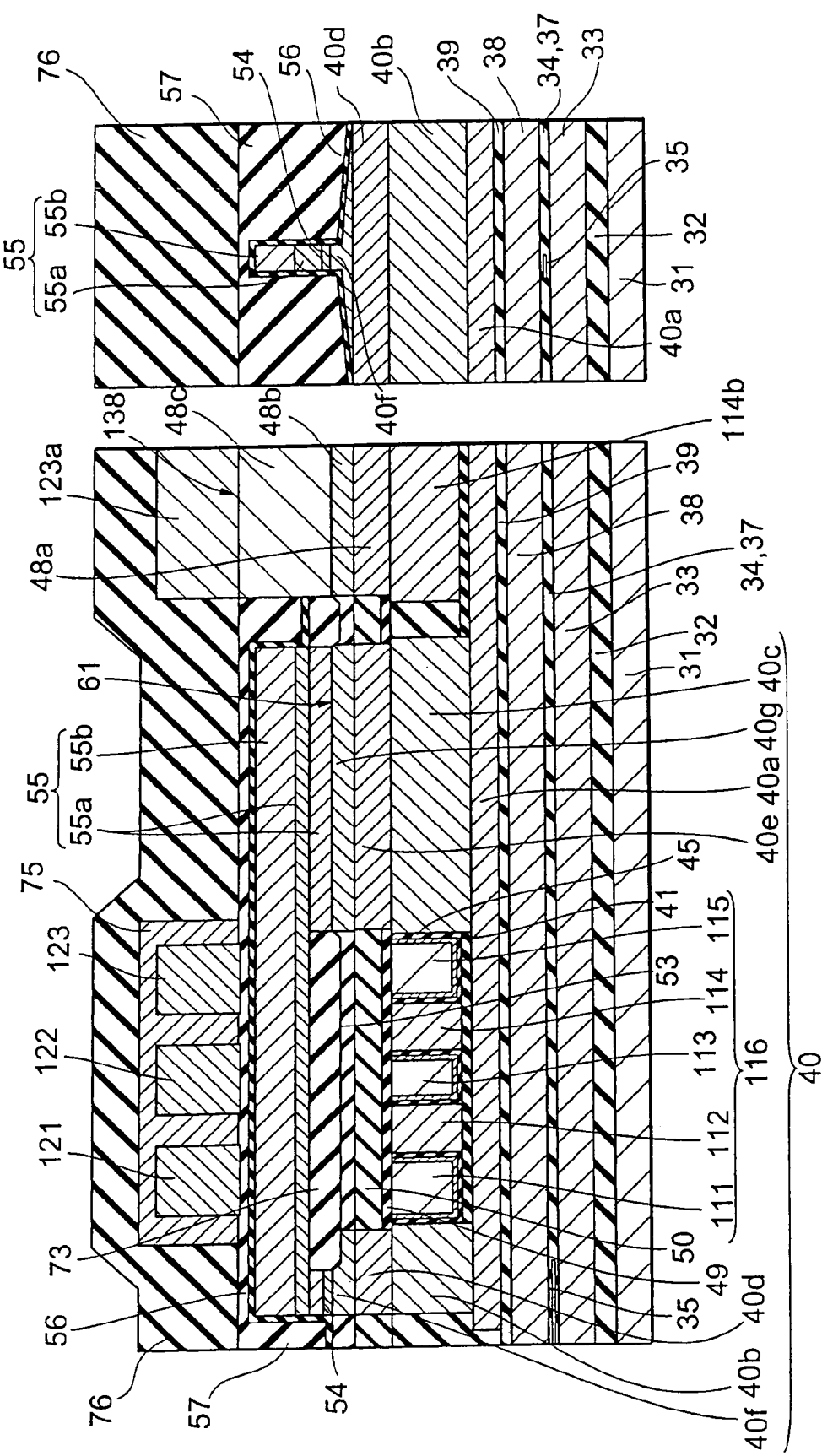
FIG. 23A
FIG. 23B

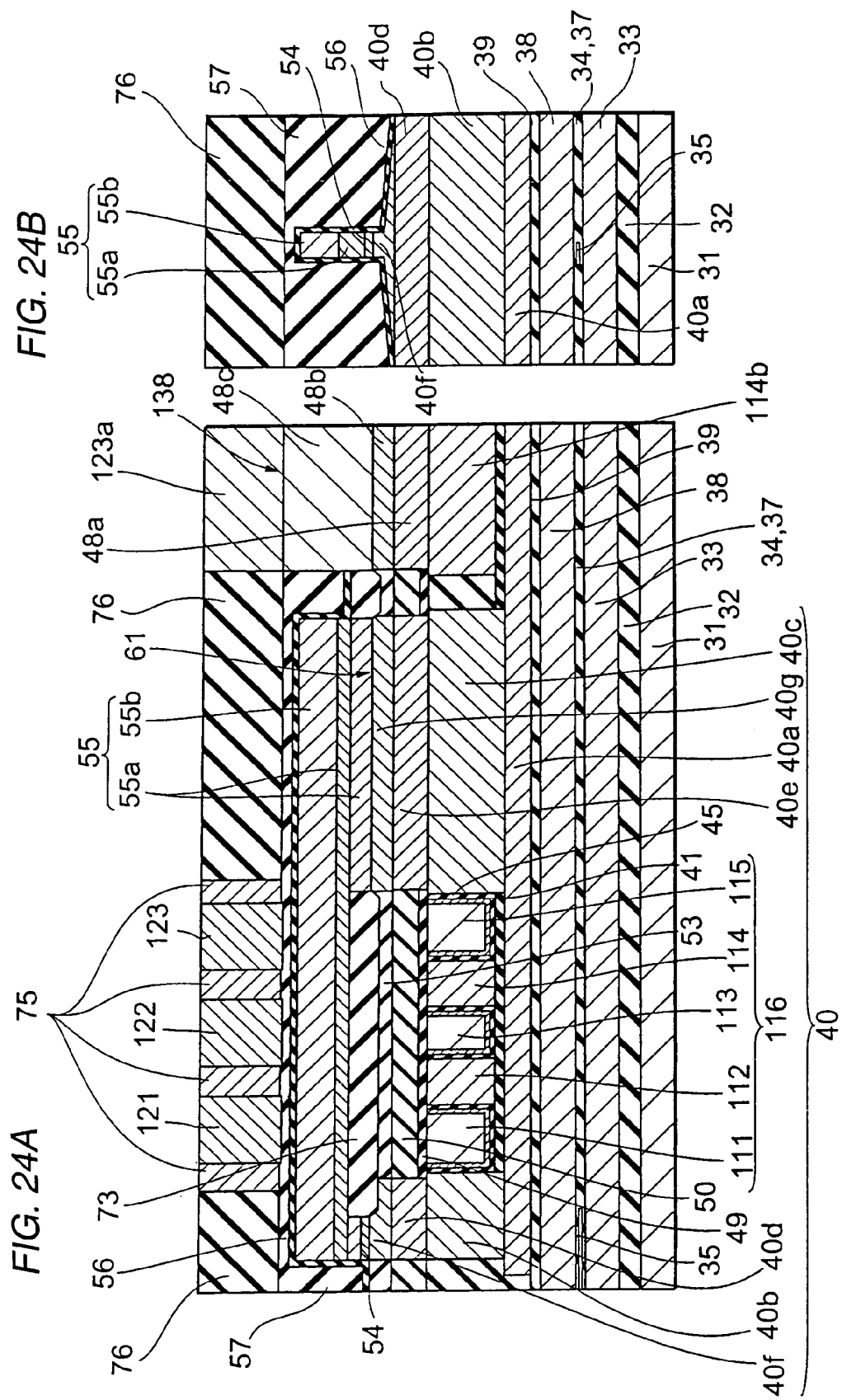

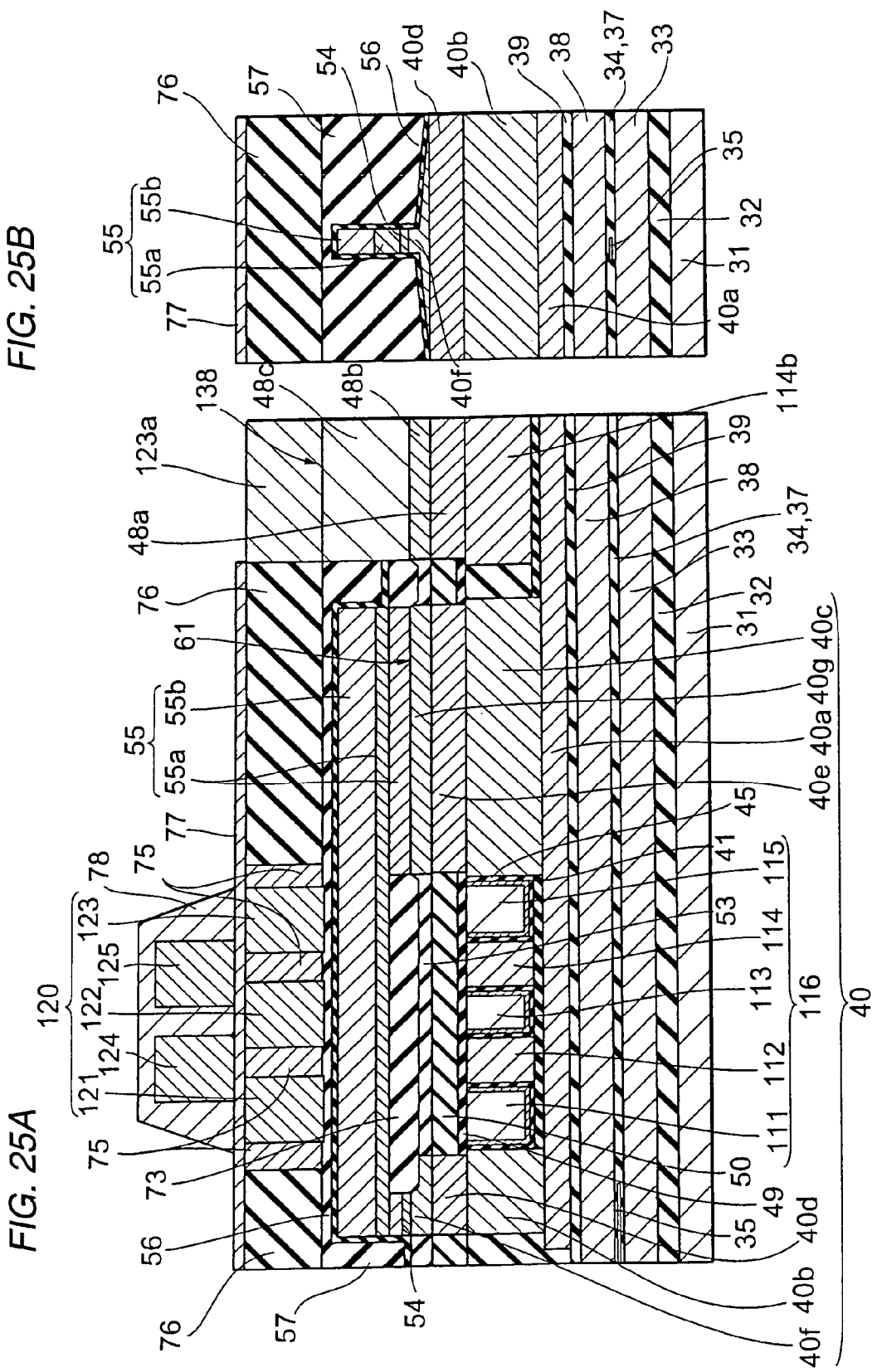

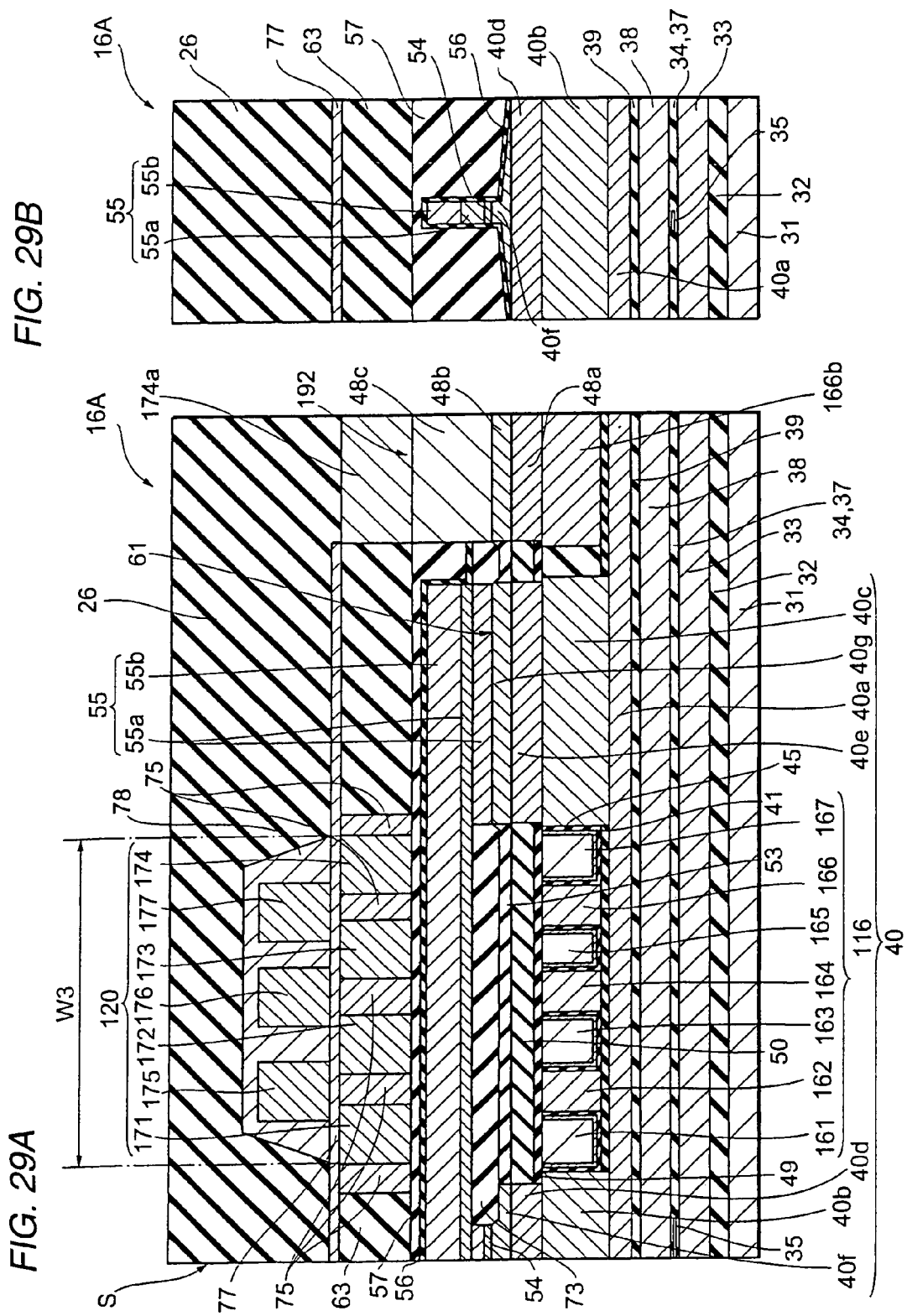

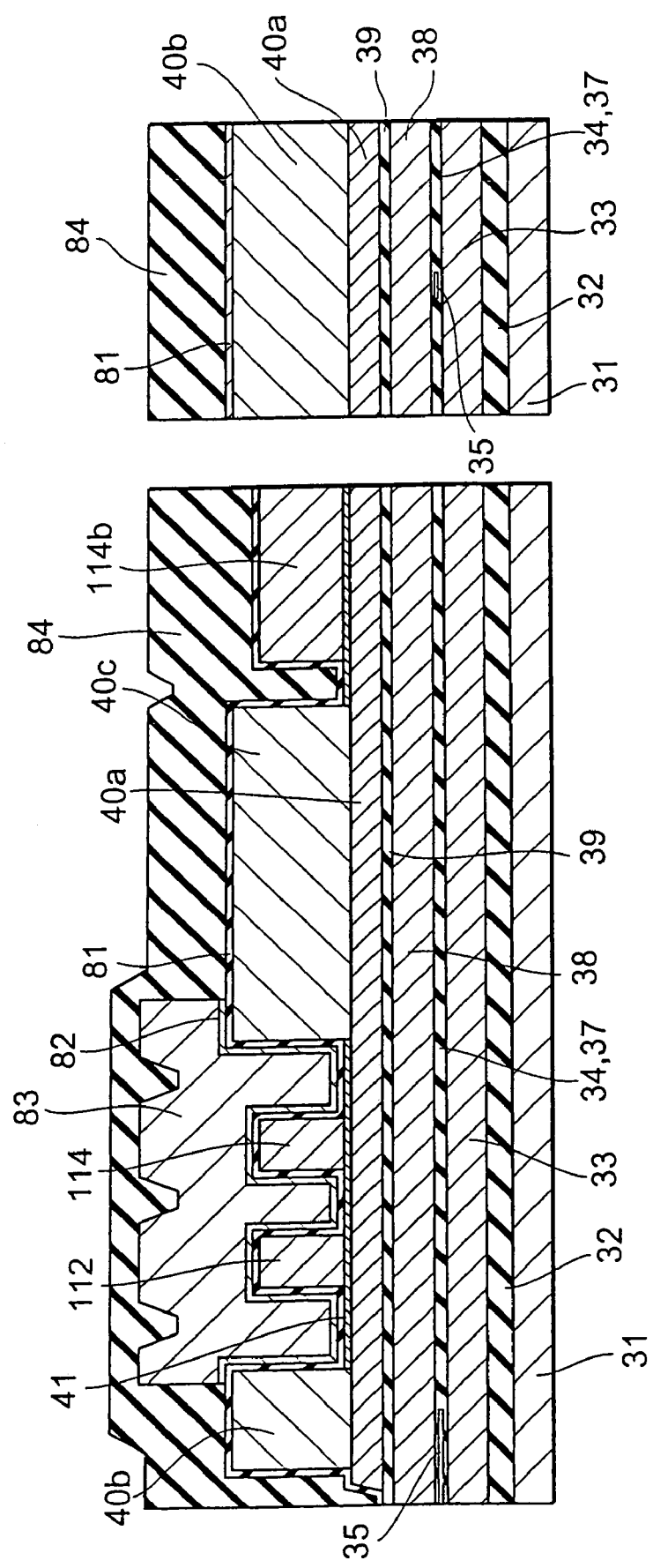

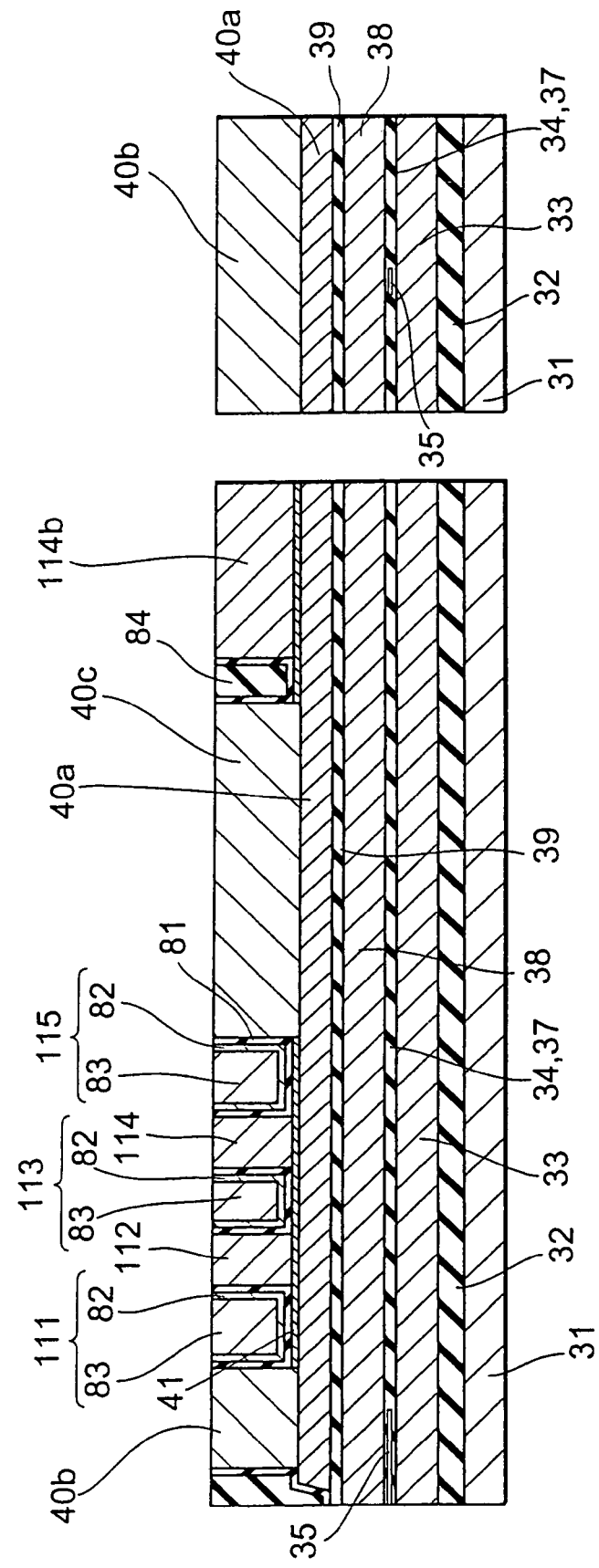

MAGNETIC HEAD WITH HELICAL COIL AND PLURAL OUTER CONDUCTOR GROUPS AND METHOD OF MANUFACTURING SAME

BACKGROUND OF THE INVENTION

1. Field of the Invention

The present invention relates to a magnetic head, a head gimbal assembly, a hard disk drive, and a method of manufacturing a magnetic head.

2. Related Background Art

In recent years, the areal density of hard disk drives has been increasing remarkably. Most recently, in particular, the areal density of hard disk drives has reached 160 to 200 Gigabytes/platter and is about to increase further. Consequently, thin-film magnetic heads have been required to improve their performances, Widely employed as a magnetic head is a combination thin-film magnetic head having a structure in which a recording head with an inductive electromagnetic transducer for writing and a reproducing head with a magnetoresistive device (MR device) for reading are laminated on each other.

A typical recording head comprises upper and lower magnetic pole layers having magnetic pole parts partly opposing each other by way of a gap layer on the side opposing a recording medium, a link part for magnetically linking the upper and lower magnetic pole layers, and a thin-film coil helically wound about at least one of the magnetic pole layers while in a state insulated from the upper and lower magnetic pole layers. The side of the recording head (magnetic head) opposing the recording medium is referred to as a medium-opposing surface or air bearing surface.

For raising the recording density among recording head performances, the track density in the recording medium is required to increase. To this aim, it is necessary to realize a recording head having a narrow track structure in which the track width, i.e., the width of the two magnetic pole parts opposing each other across the gap layer on the medium-opposing surface, is reduced to a size on the order of several microns to submicron. For realizing such a recording head, semiconductor processing techniques have been in use.

As the track width is made smaller, it becomes harder for magnetic fluxes with a high density to occur between the two magnetic pole parts opposing each other across the gap layer. Therefore, it has been desired that a magnetic flux material having a higher saturated magnetic flux density be employed as a material for the magnetic pole parts.

As the frequency of recording signals rises in order to increase the recording density, the recording head is required to improve the magnetic flux changing rate, i.e., shorten the flux rise time, and reduce deterioration in recording characteristics such as overwrite characteristic and non-linear transition shift in a high-frequency band. Shortening the magnetic path length has been known effective in improving recording characteristics in the high-frequency band. The magnetic path length is mainly determined by the length (referred to as "yoke length" in this specification) of the part between the link part and the medium-opposing surface in the lower or upper magnetic pole layer. Therefore, shortening the yoke length is effective in reducing the magnetic path length. For shortening the yoke length, it will be effective if the pitch of turns of the thin-film coil, the part of turns arranged between the link part and the medium-opposing surface in particular, is made smaller.

Meanwhile, for example, U.S. Pat. Nos. 6,043,959 and 6,191,916B1 disclose magnetic heads in which a flat spiral thin-film coil is disposed about a link part. In thus configured magnetic head, many magnetic fluxes occur in the vicinity of the link part. These magnetic fluxes are guided by the lower and upper magnetic pole layers to the magnetic pole part of the head, so as to be used as magnetic fluxes for recording.

However, the magnetic fluxes generated by the thin-film coil cannot efficiently be used as magnetic fluxes for recording in the magnetic head having the above-mentioned structure. Namely, it has been known that only a few percent of magnetic fluxes generated by the thin-film coil can be used as magnetic fluxes for recording in a magnetic head having such a structure. Therefore, the number of turns has been raised in thus configured magnetic head in order to increase the magnetic fluxes used for recording.

As a technique for reducing the pitch of turns of the thin-film coil, the above-mentioned U.S. Pat. No. 6,191,916B1 discloses a technique in which turns of the second coil are disposed between those of the first coil.

On the other hand, U.S. Pat. No. 5,995,342, Japanese Patent Application Laid-Open No. 2000-311311, and U.S. Pat. No. 6,459,543B1 disclose magnetic heads having a thin-film coil helically wound about at least one of the lower and upper magnetic pole layers. In such a magnetic head, the thin-film coil is partly disposed between the link part and the medium-opposing surface. In thus configured magnetic head, magnetic fluxes generated by the thin-film coil are efficiently used as magnetic fluxes for recording. Therefore, this magnetic head can make the number of turns of the thin-film coil smaller than that in the magnetic head having a flat spiral thin-film coil, whereby the yoke length is significantly shortened.

As mentioned above, it is desirable that the yoke length be made shorter in order to improve recording characteristics of a magnetic head in the high-frequency band. For this purpose, reducing the pitch of turns of the thin-film coil disposed between the link part and the medium-opposing surface is effective. On the other hand, increasing the number of turns of the thin-film coil is desirable for improving the recording characteristics of the magnetic head.

In any of the magnetic heads having a flat spiral thin-film coil and the magnetic heads having a helical thin-film coil, the width of the part of the thin-film coil disposed between the link part and medium-opposing surface must be made smaller in order to increase the number of turns of the thin-film coil while shortening the yoke length. This increases the ohmic value of the thin-film coil, so that a greater amount of heat is generated, whereby the magnetic pole part may project toward and collide with the recording medium. Hence, it is not so desirable to simply reduce the width of the coil in order to shorten the yoke length.

Thin-film coils are usually formed by frame plating. The frame used in the frame plating has a wall part disposed between adjacent turns in the thin-film coil. For keeping the shape of the wall part, the width thereof must have a certain extent. Therefore, when forming a thin-film coil by frame plating, it has been difficult to reduce the gap between adjacent turns of the thin-film coil.

Using the technique disclosed in Patent Document 2, the gap between adjacent turns in a flat spiral thin-film coil can be reduced. In the magnetic head disclosed in the above-mentioned U.S. Pat. No. 6,191,916B1, however, magnetic fluxes are generated by a flat spiral thin-film coil, whereby the magnetic fluxes generated by the thin-film coil cannot efficiently be used as magnetic fluxes for recording as mentioned above.

SUMMARY OF THE INVENTION

It is an object of the present invention to provide a magnetic head, a head gimbal assembly, a hard disk drive, and a method of manufacturing a magnetic head, in which recording characteristics in a high-frequency band are improved.

For achieving the above-mentioned object, the present invention provides a magnetic head comprising first and second magnetic pole layers having respective magnetic pole parts opposing each other by way of a gap layer on a side of a medium-opposing surface opposing a recording medium, a link part for magnetically linking the first and second magnetic pole layers, and a thin-film coil helically wound about at least one of the first and second magnetic pole layers while being insulated from the first and second magnetic pole layers; the thin-film coil comprising a plurality of inner conductor parts, located on the medium-opposing surface side from the link part between the first and second magnetic pole layers, extending in a direction intersecting the first or second magnetic pole layer while in parallel with each other with an insulating film interposed therebetween; a plurality of first outer conductor parts, located on a side of the first or second magnetic pole layer opposite from the side where the inner conductor parts are located, extending along the inner conductor part extending direction; a plurality of second outer conductor parts, located on a side of the first outer conductor parts opposite from the side where the inner conductor parts are located, extending along the inner conductor part extending direction; and a plurality of connecting parts for connecting the respective inner conductor parts to the first or second outer conductor parts corresponding thereto.

In this magnetic head, a thin-film coil is helically wound about at least one of first and second magnetic pole layers. Therefore, the magnetic fluxes generated by the thin-film coil can be used as magnetic fluxes for recording more efficiently in this magnetic head than in the conventional magnetic head having a flat spiral thin-film coil. The thin-film coil of the magnetic head comprises a plurality of inner conductor parts densely arranged with an insulating film interposed therebetween, and a plurality of outer conductor parts constituted by first and second outer conductor parts. Here, the second outer conductor parts are located on the side of the first outer conductor parts opposite from the side where the inner conductor parts are located. Namely, the outer conductor parts have a two-stage configuration composed of the first and second outer conductor parts in the magnetic head in accordance with the present invention, whereby the total width of the outer conductor parts can be made smaller than in the conventional magnetic head having the same number of turns of the thin-film coil and a single stage of outer conductor parts. Therefore, this magnetic head can significantly reduce the length from the medium-opposing surface to the link part while keeping magnetic fluxes used for recording, and thus is adaptable to higher frequencies.

Preferably, the first and second outer conductor parts are located on the medium-opposing surface side from the link part. In this case, the magnetic fluxes generated by the thin-film coil can be used as magnetic fluxes for recording more efficiently.

Preferably, the link part is shaped like a pillar having a cross-sectional form projecting toward the medium-opposing surface, whereas the inner conductor parts have a width minimized on a virtual line extending from a leading end of the projecting part of the link part to the medium-opposing surface, and the virtual line extending along the normal line of the medium-opposing surface, the width becoming greater as the inner conductor parts are farther from the virtual line. This can significantly restrain the thin-film coil from generating heat while in a state where the length from the medium-opposing surface to the link part is shortened.

Preferably, the distance between adjacent inner conductor parts among the plurality of inner conductor parts is substantially the same as the thickness of the insulating film. In this case, the inner conductor parts are arranged more densely, whereby the length from the medium-opposing surface to the link part can be made shorter.

Preferably, the distance between adjacent outer conductor parts among the plurality of first outer conductor parts is wider than the distance between adjacent inner conductor parts among the plurality of inner conductor parts. In this case, the first outer conductor parts can be formed easily.

Preferably, the smallest width of the first outer conductor parts is greater than the smallest width of the inner conductor parts. This can lower the ohmic value of the thin-film coil in the first outer conductor parts.

Preferably, the connecting parts are shaped like a pillar having a rectangular cross section, whereas adjacent connecting parts among the plurality of connecting parts align in a diagonal direction of the rectangular cross section. This can significantly keep adjacent connecting parts from forming a narrow gap which hinders materials from being laminated.

The present invention provides a head gimbal assembly comprising a support, a magnetic head formed on the support, a gimbal for securing the support, and a load beam connected to the gimbal; the magnetic head comprising first and second magnetic pole layers having respective magnetic pole parts opposing each other by way of a gap layer on a medium-opposing surface side, a link part for magnetically linking the first and second magnetic pole layers, and a thin-film coil helically wound about at least one of the first and second magnetic pole layers while being insulated from the first and second magnetic pole layers; the thin-film coil comprising a plurality of inner conductor parts, located on the medium-opposing surface side from the link part between the first and second magnetic pole layers, extending in a direction intersecting the first or second magnetic pole layer while in parallel with each other with an insulating film interposed therebetween; a plurality of first outer conductor parts, located on a side of the first or second magnetic pole layer opposite from the side where the inner conductor parts are located, extending along the inner conductor part extending direction; a plurality of second outer conductor parts, located on a side of the first outer conductor parts opposite from the side where the inner conductor parts are located, extending along the inner conductor part extending direction; and a plurality of connecting parts for connecting the respective inner conductor parts to the first or second outer conductor parts corresponding thereto.

In this head gimbal assembly, the thin-film coil of the magnetic head is helically wound about at least one of first and second magnetic pole layers. Therefore, the magnetic fluxes generated by the thin-film coil can be used as magnetic fluxes for recording more efficiently in this magnetic head than in the conventional magnetic head having a flat spiral thin-film coil. The thin-film coil of the magnetic head comprises a plurality of inner conductor parts densely arranged with an insulating film interposed therebetween, and a plurality of outer conductor parts constituted by first and second outer conductor parts. Here, the second outer conductor parts are located on the side of the first outer conductor parts opposite from the side where the inner conductor parts are located. Namely, the outer conductor parts have a two-stage configuration composed of the first and second outer conductor parts in the magnetic head in accordance with the present invention, whereby the total width of the outer conductor parts can be made smaller than in the conventional magnetic head having the same number of turns of the thin-film coil and a single stage of outer conductor parts. Therefore, the head gimbal assembly equipped with this magnetic head can significantly reduce the length from the medium-opposing surface to the link part while keeping magnetic fluxes used for recording, and thus is adaptable to higher frequencies.

The present invention provides a hard disk drive comprising a support, a magnetic head formed on the support, and a recording medium opposing the magnetic head; the magnetic head comprising first and second magnetic pole layers having respective magnetic pole parts opposing each other by way of a gap layer on a medium-opposing surface side, a link part for magnetically linking the first and second magnetic pole layers, and a thin-film coil helically wound about at least one of the first and second magnetic pole layers while being insulated from the first and second magnetic pole layers; the thin-film coil comprising a plurality of inner conductor parts, located on the medium-opposing surface side from the link part between the first and second magnetic pole layers, extending in a direction intersecting the first or second magnetic pole layer while in parallel with each other with an insulating film interposed therebetween; a plurality of first outer conductor parts, located on a side of the first or second magnetic pole layer opposite from the side where the inner conductor parts are located, extending along the inner conductor part extending direction; a plurality of second outer conductor parts, located on a side of the first outer conductor parts opposite from the side where the inner conductor parts are located, extending along the inner conductor part extending direction; and a plurality of connecting parts for connecting the respective inner conductor parts to the first or second outer conductor parts corresponding thereto.

In this hard disk drive, the thin-film coil of the magnetic head is helically wound about at least one of first and second magnetic pole layers. Therefore, the magnetic fluxes generated by the thin-film coil can be used as magnetic fluxes for recording more efficiently in this magnetic head than in the conventional magnetic head having a flat spiral thin-film coil. The thin-film coil of the magnetic head comprises a plurality of inner conductor parts densely arranged with an insulating film interposed therebetween, and a plurality of outer conductor parts constituted by first and second outer conductor parts. Here, the second outer conductor parts are located on the side of the first outer conductor parts opposite from the side where the inner conductor parts are located. Namely, the outer conductor parts have a two-stage configuration composed of the first and second outer conductor parts in the magnetic head in accordance with the present invention, whereby the total width of the outer conductor parts can be made smaller than in the conventional magnetic head having the same number of turns of the thin-film coil and a single stage of outer conductor parts. Therefore, the hard disk drive equipped with this magnetic head can significantly reduce the length from the medium-opposing surface to the link part while keeping magnetic fluxes used for recording, and thus is adaptable to higher frequencies.

The present invention provides a method of manufacturing a magnetic head, the method being employed for manufacturing a magnetic head comprising first and second magnetic pole layers having respective magnetic pole parts opposing each other by way of a gap layer on a medium-opposing surface side, a link part for magnetically linking the first and second magnetic pole layers, and a thin-film coil helically wound about at least one of the first and second magnetic pole layers while being insulated from the first and second magnetic pole layers; the method comprising a step of forming the first magnetic pole layer, a step of forming the gap layer on the first magnetic pole layer, a step of forming the second magnetic pole layer on the gap layer, a step of forming the link part, and a step of forming the thin-film coil; the step of forming the thin-film coil comprising the steps of forming a plurality of inner conductor parts, located on the medium-opposing surface side from the link part between the first and second magnetic pole layers, extending in a direction intersecting the first or second magnetic pole layer while in parallel with each other with an insulating film interposed therebetween; a plurality of first outer conductor parts, located on a side of the first or second magnetic pole layer opposite from the side where the inner conductor parts are located, extending along the inner conductor part extending direction; a plurality of second outer conductor parts, located on a side of the first outer conductor parts opposite from the side where the inner conductor parts are located, extending along the inner conductor part extending direction; and a plurality of connecting parts for connecting the respective inner conductor parts to the first or second outer conductor parts corresponding thereto; each constituting the thin-film coil.

This method of manufacturing a magnetic head forms a thin-film coil helically wound about at least one of the first and second magnetic pole layers. Therefore, the resulting magnetic head can use the magnetic fluxes generated by the thin-film coil more efficiently as magnetic fluxes for recording than does the conventional magnetic head having a flat spiral thin-film coil. This thin-film coil is formed by a plurality of inner conductor parts densely arranged with an insulating film interposed therebetween, and first and second outer conductor parts. Here, the second outer conductor parts are located on the side of the first outer conductor parts opposite from the side where the inner conductor parts are located. Namely, the method of manufacturing a magnetic head in accordance with the present invention forms outer conductor parts having a two-stage configuration composed of first and second outer conductor parts, and thus can produce a magnetic head in which the total width of the outer conductor parts is smaller than that in the conventional magnetic head having a single stage of outer conductor parts and the same number of turns. Therefore, this method of manufacturing a magnetic head can make a magnetic head which can significantly shorten the length of the magnetic head from the medium-opposing surface to the link part while keeping the magnetic fluxes used for recording and being adaptable to higher frequencies. The order of the steps in the method of manufacturing a magnetic head in accordance with the present invention is not limited to that mentioned above but can be altered as appropriate. A plurality of steps may be carried out at the same time if necessary.

Preferably, the first and second outer conductor parts are located on the medium-opposing surface side from the link part. In this case, the magnetic fluxes generated by the thin-film coil are more efficiently used as magnetic fluxes for recording.

BRIEF DESCRIPTION OF THE DRAWINGS

FIG. 5 is a plan view showing first outer conductor parts constituting the thin-film coil;

FIG. 6 is a plan view showing second outer conductor parts constituting the thin-film coil;

FIGS. 7A is a sectional view taken along the line α—α of FIG. 4, whereas FIG. 7B is a sectional view of an opposing magnetic pole part taken along a line parallel to an air bearing surface S;

FIGS. 8A and 8B are sectional views showing a step in the process of manufacturing a thin-film magnetic head;

FIGS. 9A and 9B are sectional views showing a step subsequent to FIGS. 8A and 8B;

FIGS. 11A and 11B are sectional views showing a step subsequent to FIGS. 10A and 10B;

FIGS. 12A and 12B are sectional views showing a step subsequent to FIGS. 11A and 11B;

FIGS. 13A and 13B are sectional views showing a step subsequent to FIGS. 12A and 12B;

FIGS. 15A and 15B are sectional views showing a step subsequent to FIGS. 14A and 14B;

FIGS. 16A and 16B are sectional views showing a step subsequent to FIGS. 15A and 15B;

FIGS. 17A and 17B are sectional views showing a step subsequent to FIGS. 16A and 16B;

FIGS. 19A and 19B are sectional views showing a step subsequent to FIGS. 18A and 18B;

FIGS. 20A and 20B are sectional views showing a step subsequent to FIGS. 19A and 19B;

FIGS. 22A and 22B are sectional views showing a step subsequent to FIGS. 21A and 21B;

FIGS. 23A and 23B are sectional views showing a step subsequent to FIGS. 22A and 22B;

FIGS. 24A and 24B are sectional views showing a step subsequent to FIGS. 23A and 23B;

FIGS. 25A and 25B are sectional views showing a step subsequent to FIGS. 24A and 24B;

FIG. 29A is a sectional view taken along the line β—β of FIG. 26, whereas FIG. 29B is a sectional view of an opposing magnetic pole part taken along a line parallel to the air bearing surface S;

FIGS. 31A and 31B are sectional views showing a step subsequent to FIGS. 30A and 30B; and FIGS. 32A and 32B are sectional views showing a step subsequent to FIGS. 31A and 31B.

DETAILED DESCRIPTION OF THE PREFERRED EMBODIMENTS

In the following, embodiments of the present invention will be explained in detail with reference to the accompanying drawings. Constituents identical or equivalent to each other will be referred to with numerals identical to each other without repeating their overlapping explanations.

FIRST EMBODIMENT

Figure 1:
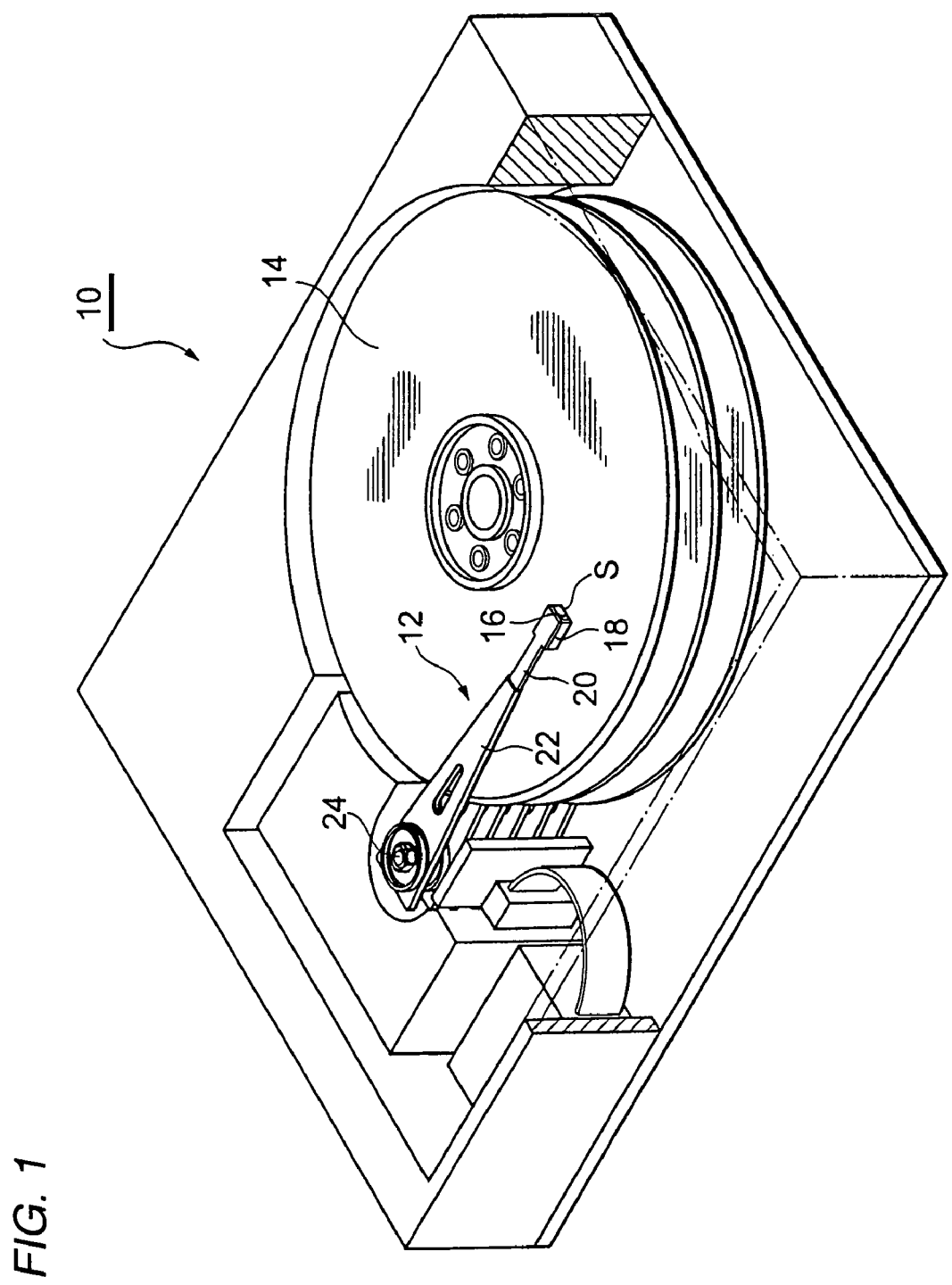
FIG. 1 is a schematic perspective view showing a hard disk drive equipped with the thin-film magnetic head in accordance with an embodiment.

FIG. 1 is a schematic perspective view showing a hard disk drive equipped with the thin-film magnetic head in accordance with an embodiment. The hard disk drive 10 is one in which a head gimbal assembly (HGA) 12 is actuated, so that a thin-film magnetic head 16 records/reproduces magnetic information onto/from a recording surface (the upper face in FIG. 1) of a hard disk (recording medium) 14 rotating at a high speed. The head gimbal assembly 12 comprises a gimbal 20 mounted with a head slider 18 formed with the thin-film magnetic head 16, and a suspension arm (load beam) 22 connected thereto, and is rotatable about a shaft 24 by a voice coil motor, for example. As the head gimbal assembly 12 rotates, the head slider 18 moves radially of the hard disk 14, i.e., in directions traversing track lines.

Figure 2:
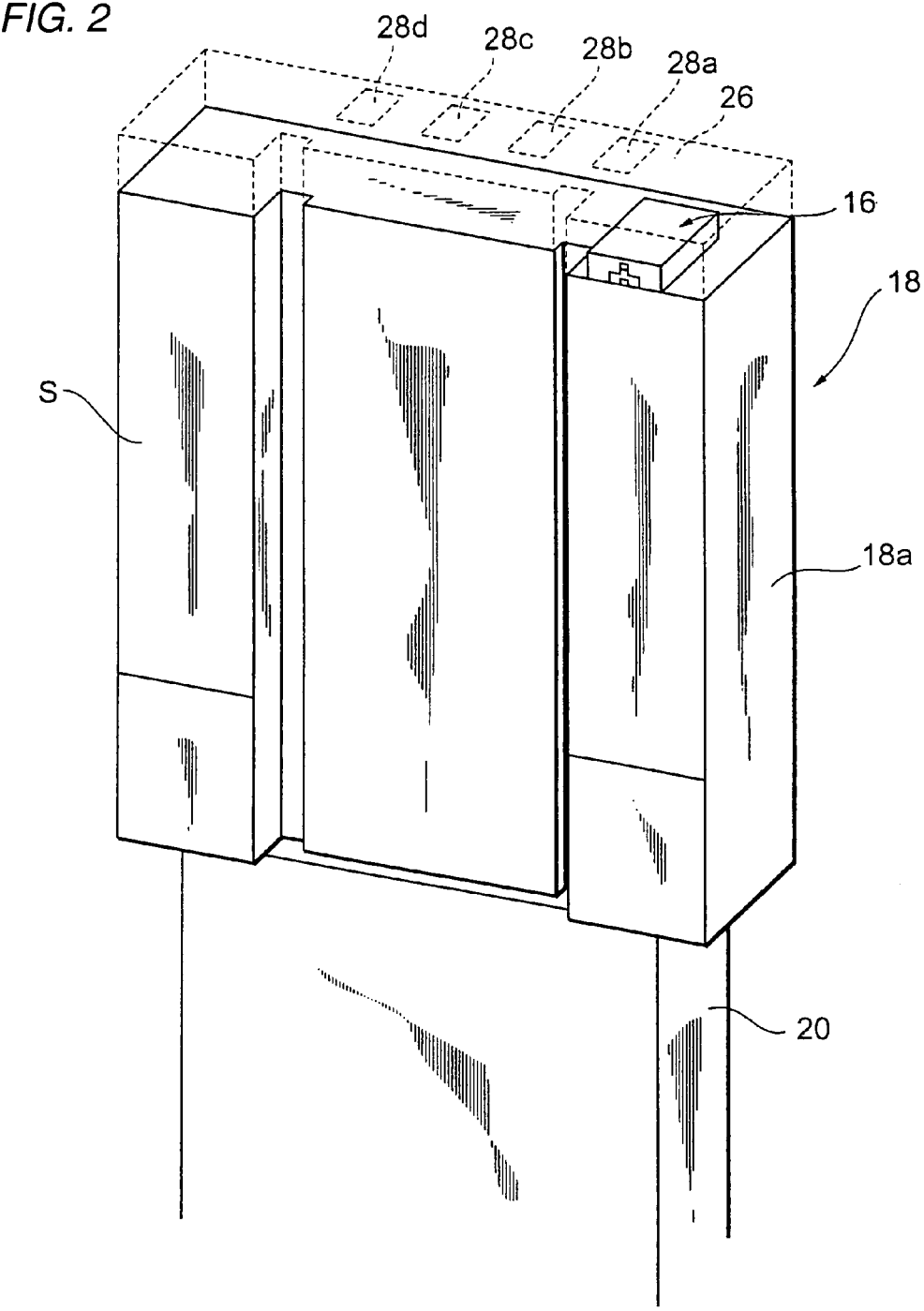
FIG. 2 is an enlarged perspective view of a head slider.

FIG. 2 is an enlarged perspective view of the head slider 18. The head slider 18 comprises a support 18a, mainly composed of AlTiC ($Al_2O_3.TiC$), having a substantially rectangular parallelepiped form, on which the thin-film magnetic head 16 is formed. The front face in the drawing is a recording-medium-opposing surface opposing the recording surface of the hard disk 14 and is referred to as an air bearing surface (ABS) S. As the hard disk 14 rotates, the airflow accompanying the rotation levitates the head slider 18, whereby the air bearing surface S is separated from the recording surface of the hard disk 14. The thin-film magnetic head 16 is provided with an overcoat layer 26 (which will be explained later in detail) indicated by broken lines in the drawing for protecting the thin-film magnetic head 16. Attached onto the overcoat layer 26 are recording pads 28a, 28b and reproducing pads 28c, 28d. Leads (not depicted), connected to the pads, for inputting and outputting electric signals are attached to the suspension arm 22 shown in FIG. 1. The air bearing surface S may be provided with a coating such as DLC (Diamond-Like Carbon).

Thin-Film Magnetic Head

With reference to FIG. 3 to 7B, the thin-film magnetic head 16 will now be explained.

The thin-film magnetic head 16 in accordance with this embodiment comprises a substrate 31, and a reproducing head and a recording head (inductive electromagnetic transducer) which are laminated on the substrate, while having the air bearing surface S opposing the hard disk 14. The structure of a main part of the thin-film magnetic head 16 will be explained in the following, whereas the other part of the structure of the thin-film magnetic head will be explained later in the manufacturing process.

The reproducing head comprises an MR device 35, disposed near the air bearing surface S, for detecting magnetic signals. The reproducing head further comprises a lower shield layer 33 and an upper shield layer 38 which are disposed so as to oppose each other across the MR device 35 on the air bearing surface S side while shielding the MR device 35, a lower shield gap film 34 disposed between the MR device 35 and the lower shield layer 33, and an upper shield gap film 37 disposed between the MR device 35 and the upper shield layer 38.

The recording head has a configuration in which a lower magnetic pole layer (first magnetic pole layer) 40, an upper magnetic pole layer (second magnetic pole layer) 55, a recording gap layer (gap layer) 54, and a thin-film coil 110 are laminated on the substrate 31. The lower magnetic pole layer 40 and upper magnetic pole layer 55 have respective magnetic pole parts (opposing magnetic pole parts) opposing each other on the air bearing surface S side and are magnetically linked to each other at a link part 61 which will be explained later. The recording gap layer 54 is formed between the respective magnetic pole parts of the lower magnetic pole layer 40 and upper magnetic pole layer.55. The thin-film coil 110 is helically wound about the upper magnetic pole layer 55 while being insulated from the lower magnetic pole layer 40 and upper magnetic pole layer 55.

As shown in FIGS. 7A and 7B, the lower magnetic pole layer 40 comprises a first magnetic pole part 40a, a second magnetic pole part 40b, a third magnetic pole part 40c, a fourth magnetic pole part 40d, a fifth magnetic pole part 40e, a sixth magnetic pole part 40f, and a seventh magnetic pole part 40g.

Figure 4:
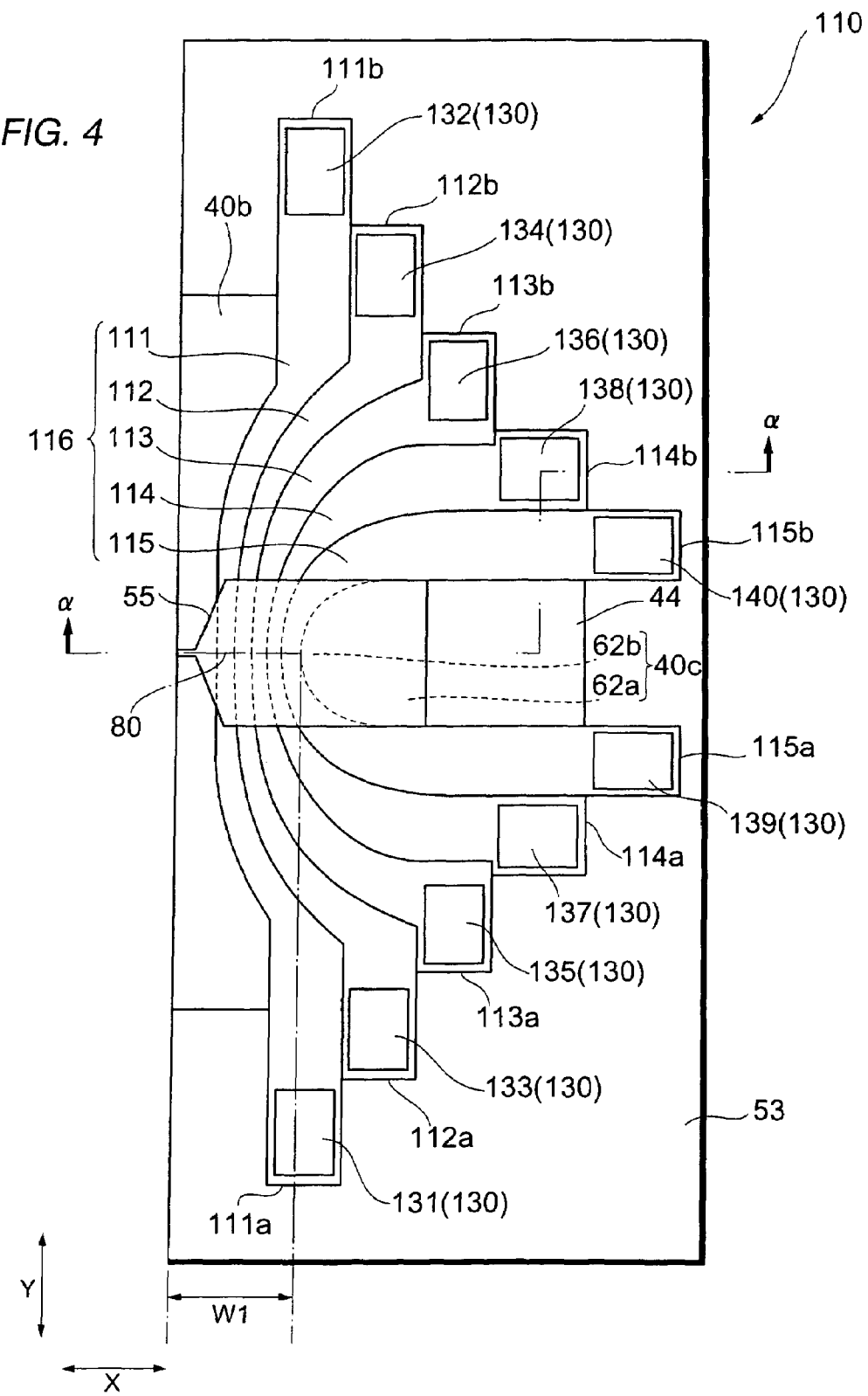
FIG. 4 is a plan view showing a first conductor group and a connecting part group which constitute a thin-film coil.

The first magnetic pole part 40a is disposed at a position opposing a first conductor group 116 in the thin-film coil 110. The second magnetic pole part 40b is connected to the first magnetic pole part 40a so as to project toward the upper magnetic pole layer 55 in the vicinity of the air bearing surface S as compared with the first magnetic pole part 40a. The third magnetic pole part 40c is connected to the first magnetic pole part 40a so as to project toward the upper magnetic pole part 55 at a position separated from the air bearing surface S by way of a part of the first conductor group 116 and second conductor group 120 which will be explained later as compared with the first magnetic pole part 40a. As shown in FIG. 4, the third magnetic pole part 40c comprises a pillar part 62a and a projecting part 62b projecting from the pillar part 62a toward the air bearing surface S, whereas the projecting part 62b has a curved surface (cylindrical curved surface) forming a part of a cylinder. The pillar part 62a is formed like a pillar having a rectangular cross section.

The third magnetic pole part 40c, fifth magnetic pole part 40e, and seventh magnetic pole part 40g constitute the link part 61 for magnetically linking the upper magnetic pole layer 55 and the lower magnetic pole layer 40 to each other (see FIG. 7A). In the sixth magnetic pole part 40f, the part opposing a track width defining part 55A, which will be explained later, across the recording gap layer 54 acts as an opposing magnetic pole part in the present invention.

As shown in FIG. 7B, the lower magnetic pole layer 40 and upper magnetic pole layer 55 have a trimmed structure. This trimmed structure prevents an effective recording track width from increasing because of the spread of magnetic fluxes occurring at the time of writing into a narrow track.

Figure 3:
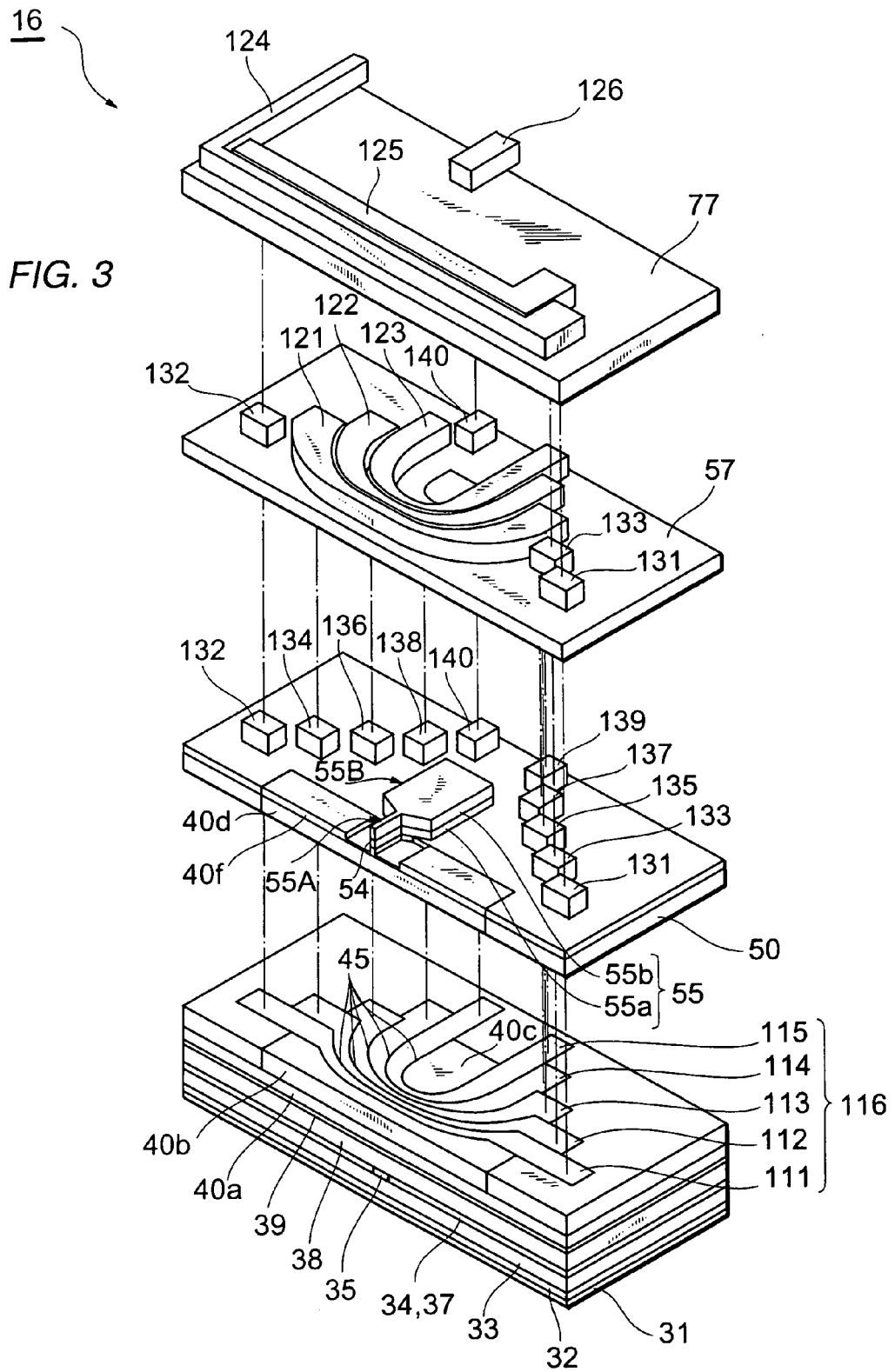
FIG. 3 is an exploded perspective view showing a main part of the thin-film magnetic head in accordance with a first embodiment of the present invention.

As shown in FIG. 3, the upper magnetic pole layer 55 comprises a first magnetic pole part 55a in contact with the recording gap layer 54, and a second magnetic pole part 55b disposed on the first magnetic pole part 55a. The upper magnetic pole layer 55 further comprises the track width defining part 55A and a yoke part 55B. The track width defining part 55A acts as an opposing magnetic pole part defining a recording track width. The track width defining part 55A includes an end part disposed at the air bearing surface S, and an arm connecting with the yoke part 55B from the end part. The yoke part 55B comprises a fixed width part having a fixed width, and a taper part whose width tapers down from the fixed width part toward the track width defining part 55A.

The thin-film coil 110 comprises the first conductor group 116, second conductor group 120, and connecting part group 130, which connect with each other, so as to form a series of 5 turns which are helically wound about the upper magnetic pole layer 55.

As shown in FIGS. 3, 4, and 7A, the first conductor group 116 (composed of a plurality of inner conductor parts) comprises first inner conductor parts 112, 114 and second inner conductor parts 111, 113, 115 disposed between the lower magnetic pole layer 40 and upper magnetic pole layer 55. The first conductor group 116 has an insulating contact structure in which those adjacent each other among the inner conductor parts 111 to 115 are in contact with each other by way of a separation insulating film 45 which will be explained later, and is disposed in an area of the first magnetic pole part 40a where the insulating film 41 is arranged. The inner conductor part 111 is in contact with the second magnetic pole part 40b by way of the separation insulating film 45, whereas the inner conductor part 115 is in contact with the, third magnetic pole part 40c by way of the separation insulating film 45 (see FIGS. 3 and 7A).

As shown in FIG. 4, the inner conductor parts 111 to 115 comprise their respective pairs of rectangular end parts 111a to 115a and 111b to 115b, each pair of end parts being distanced substantially equally from the air bearing surface S. Between both end parts, the inner conductor parts 111 to 115 project toward the air bearing surface S substantially like arches, while being aligned along a direction (Y direction in FIGS. 4 to 6) intersecting the upper magnetic pole layer 55 in the area corresponding to the upper magnetic pole layer 55. Between both end parts, the inner conductor parts 111 to 115 have a density changing structure in which the density of their arrangement varies in a direction (X direction in FIGS. 4 to 6) intersecting the air bearing surface S. Namely, the number of inner conductor parts 111 to 115 arranged in a region having a width W1 equal to the length of the depicted virtual line 80 (arrangement number) successively increases from 1 to 5 from the outside to inside of the upper magnetic pole layer 55. Here, the virtual line 80 is a virtual line extending from the leading end of the projecting part 62b to the air bearing surface S along a normal direction (X direction) of the air bearing surface S. As a consequence, the first conductor group 116 is configured such that the inner conductor parts 111 to 115 become denser toward the upper magnetic pole layer 55, thereby reducing the winding pitch.

Also, the inner conductor parts 111 to 115 have a variable width structure in which their width (path width) in a direction intersecting a current gradually increases from a part corresponding to the upper magnetic pole layer 55 to the outside thereof, whereas their narrowest part where the path width is the narrowest is located at a position corresponding to the projecting part 62b of the third magnetic pole part 40c Namely, the path width of the inner conductor parts 111 to 115 is the smallest on the virtual line 80 extending along the normal line of the air bearing surface S from the leading end of the projecting part 62b of the link part 61 to the air bearing surface S, and increases as the inner conductor parts 111 to 115 are distanced farther from the virtual line 80 (see FIG. 4).

The separation insulating film 45 has a thickness not greater than the shortest distance between the bottom of the first conductor group 116 and the lower magnetic pole layer 40. Namely, as shown in FIG. 7A, the shortest distance between the first conductor group 116 and the lower magnetic pole layer 40 equals the thickness of the insulating film 41 interposed between the bottom of the inner conductor parts 112, 114 and the lower magnetic pole layer 40, whereas the thickness of the separation insulating film 45 is not greater than that of the insulating film 41.

On the other hand, as shown in FIGS. 3, 5, and 6, the second conductor group 120 has a two-stage configuration comprising first outer conductor parts 121, 122, 123 on the lower stage and second outer conductor parts 124, 125 on the upper stage. Namely, the first outer conductor parts 121, 122, 123 are located on the side of the upper magnetic pole layer 55 opposite from the side where the first conductor group 116 is located, whereas the second outer conductor parts 124, 125 are located on the side of the first outer conductor parts 121, 122, 123 opposite from the side where the first conductor group 116 is located. The first outer conductor parts 121, 122, 123 and second outer conductor parts 124, 125 are disposed on the outside of (above) the upper magnetic pole layer 55.

Among the second conductor group 120, the first outer conductor parts 121, 122, 123 comprise their respective pairs of rectangular end parts 121a, 122a, 123a and 121b, 122b, 123b. Between both end parts, the conductor parts 121, 122, 123 project toward the air bearing surface S substantially like arches, while being aligned in a direction (Y direction in FIGS. 4 to 6) intersecting the upper magnetic pole layer 55 in the part corresponding to the upper magnetic pole layer 55 as with the first conductor group 116. Also, the first outer conductor parts 121, 122, 123 have a density changing structure in which the arrangement density varies in a direction intersecting the air bearing surface S. Further, the first outer conductor parts 121, 122, 123 have a variable width structure in which their path width gradually increases from a part corresponding to the upper magnetic pole layer 55 to the outside thereof, whereas their narrowest part where the path width is the narrowest is located at a position corresponding to the projecting part 62b of the third magnetic pole part 40c.

On the other hand, above the first outer conductor parts 121, 122, 123, the second outer conductor parts 124, 125 align in a direction (Y direction in FIGS. 4 to 6) intersecting the upper magnetic pole layer 55. The second outer conductor part 125 comprises rectangular end parts 125a, 125b at both ends, whereas the second outer conductor part 124 has a rectangular end part 124b at one end. Though each of the second outer conductor parts 124, 125 has a fixed width structure with a fixed width, it may be changed to a variable width structure as with the first outer conductor parts 121, 122, 123 as appropriate.

The connecting part group 130 will now be explained.

The connecting part group 130 comprises a plurality of connecting parts 131 to 140, each having a pillar form with a rectangular cross section. In the following manner, the connecting parts 131 to 140 are provided so as to connect their corresponding inner conductor parts 111 to 115 and outer conductor parts 121 to 125 to each other.

Namely, the connecting parts 131, 133, 135, 137, 139 are disposed so as to connect the rectangular end parts 111a to 115a of the inner conductor parts 111 to 115 to the rectangular end parts 121b to 125b of the outer conductor parts 121 to 125, respectively. The connecting parts 132, 134, 136, 138 are disposed so as to connect the rectangular end parts 111b to 114b of the inner conductor parts 111 to 114 to the rectangular end parts 121a, 122a, 123a, 125a of the outer conductor parts 121, 122, 123, 125, respectively. The connecting part 140 is disposed so as to connect the rectangular end part 115b of the inner conductor part 115 to a lead layer 126.

The thin-film coil 110 extends from the outer conductor part 124 to the inner conductor part 111 by way of the connecting part 131, and from the connecting part 131 to the outer conductor part 125 by way of the connecting part 132, thus forming 1 turn of loop. In the same manner, a 4-turn loop is formed, whereby the thin-film coil 110 forms a series of helical loops as a whole. Thereafter, the thin-film coil 110 is connected from the lead layer 126 to an external electrode pad which is not depicted (an undepicted electrode pad being connected to the second outer conductor part 124 as well).

As mentioned above, the thin-film coil 110 is helically wound about the upper magnetic pole layer 55, whereby the magnetic fluxes generated by the thin-film coil 110 can be used as magnetic fluxes for recording more efficiently in the thin-film magnetic head 16 than in the conventional magnetic head using a flat spiral thin-film coil. Therefore, the thin-film magnetic head 16 can make the number of turns of the thin-film coil 110 smaller than that in the conventional magnetic head, whereby the yoke length (the length from the medium-opposing surface S to the link part 61) can be shortened. As compared with the thin-film magnetic head having a flat spiral thin-film coil, the thin-film magnetic head 16 can be made smaller since it can reduce the area where the thin-film coil 110 is arranged.

The thin-film coil 110 has an insulating contact structure in which the inner conductor parts 111 to 115 constituting the first conductor group 116 are in contact with each other by way of an insulating film (separation insulating film 45). Therefore, only the insulating film exists between those adjacent each other among the inner conductor parts 111 to 115, the gap between the adjacent inner conductor parts being equal to the thickness of the insulating film (separation insulating film 45). Hence, the inner conductor parts 111 to 115 are arranged with a high density with substantially no gap between adjacent ones, whereby the yoke length is shortened. Therefore, the yoke length can be shortened without narrowing the passage width of each inner conductor part so much. In other words, since the shortest distance between (the projecting part 62b of) the third magnetic pole layer 40c and the air bearing surface S, i.e., the length of the virtual line 80, becomes the yoke length, the fact that the first conductor group 116 has the above-mentioned high density arrangement shortens the yoke length. Also, since each inner conductor part is not required to narrow the passage width so much, the current flow is not hindered greatly thereby, whereby the ohmic value is restrained from rising.

Since the second conductor group (outer conductor part) 120 has a two-stage configuration composed of the first outer conductor parts 121, 122, 123 and second outer conductor parts 124, 125, the magnetic head 16 can make the total width W2 of the second conductor group 120 (see FIG. 7A) shorter than that in the conventional magnetic head having one stage of the outer conductor part and the same number of turns of the thin-film coil. Therefore, this magnetic head 16 can significantly reduce the yoke length while keeping magnetic fluxes used for recording, and thus is adaptable to higher frequencies.

Since the second conductor group 120 is located on the air bearing surface (medium-opposing surface) S side from the link part 61 for magnetically linking the upper magnetic pole layer 55 to the lower magnetic pole layer 40, the magnetic fluxes generated by the thin-film coil 110 can be used as magnetic fluxes for recording more efficiently. Since the parts having density changing structures in the thin-film coil 110, i.e., the variable width structures of the inner conductor parts 111 to 115 and the first outer conductor parts 121, 122, 123, are disposed in close proximity to the air bearing surface S, the magnetic fluxes generated by the thin-film coil 110 are efficiently used for recording.

As mentioned above, the passage width of the inner conductor part 116 is the smallest on the virtual line 80 (see FIG. 4) and increases as the inner conductor part 116 is distanced farther from the virtual line 80, whereby the heat generated from the thin-film coil 110 can significantly be suppressed while in a state where the yoke length is shortened.

The inner conductor parts 111, 115 located on both end sides of the first conductor group 116 are in contact with the third magnetic pole part 40*c* and the second magnetic pole part 40*b* by way of the separation insulating film 45 alone. This fact contributes to further shortening the yoke length.

In the thin-film coil 110, the inner conductor parts 111 to 115 and first outer conductor parts 121, 122, 123 have density changing structures. Therefore, even when the yoke length is shortened by narrowing the width W1, winding is ensured on the virtual line 80, whereby the number of turns is secured in the thin-film coil 110. Hence, the thin-film magnetic head 16 can shorten the yoke length while securing the number of turns. This realizes a thin-film magnetic head having an excellent recording characteristic in a high frequency band.

Since the inner conductor parts 111 to 115 and first outer conductor parts 121, 122, 123 have variable width structures as mentioned above, they are less likely to hinder the current flow and thus can suppress the increase in ohmic value. Therefore, the thin-film magnetic head 16 can effectively restrain the thin-film coil 110 from generating heat. Since the third magnetic pole part 40*c* has the projecting part 62*b*, the widths of the inner conductor parts 111 to 115 and first outer conductor parts 121, 122, 123 vary in conformity to the projecting part 62*b*. Since the inner conductor parts 111 to 115 and first outer conductor parts 121, 122, 123 have the narrowest parts at positions corresponding to the projecting part 62*b*, the area where the passage width is narrowed is minimized. Therefore, a current can flow more easily, thereby suppressing the increase in ohmic value.

As shown in FIG. 4, in the connecting parts 130 for connecting the inner conductor parts 111 to 115 to the outer conductor parts 121 to 125, the connecting parts adjacent each other align in a direction along a diagonal direction of the rectangular cross section. Therefore, no narrow space is formed between the adjacent connecting parts, whereby materials for the connecting parts can be laminated at a predetermined position with a high accuracy in a step of forming the connecting parts which will be explained later.

As will be explained later in detail, the separation insulating film 45 is made by laminating a plurality of thin alumina films which are formed by CVD, and thus is a dense film. Therefore, the second magnetic pole part 40*b* disposed on the virtual line 80, the first conductor group 116, and the third magnetic pole part 40*c* can reliably be insulated from each other while the gaps therebetween are made very small.

The distance between the first outer conductor parts 121, 122, 123 adjacent each other is wider than the distance between the inner conductor parts 111 to 115 adjacent each other. Therefore, as will be explained later in detail, the first outer conductor parts 121, 122, 123 can easily be formed by a simple method such as plating without using CVD.

The smallest width of the first outer conductor parts 121, 122, 123 is greater than the smallest width of the inner conductor parts 111, 112, 113, 114, 115, whereby the ohmic value of the thin-film coil 110 in the first outer conductor parts 121, 122, 123 is reduced. Namely, since the second conductor group 120 has a two-stage configuration, the number of conductor parts formed in one stage can be made smaller than the number of inner conductor parts, whereby the outer conductor parts can be formed wider than the inner conductor parts.

As will be explained later, highly saturated magnetic flux density materials can be used as materials for the second magnetic pole part 40*b*, fourth magnetic pole part 40*d*, sixth magnetic pole part 40*f*, and upper magnetic pole layer 55, whereby the magnetic path can be prevented from being saturated with magnetic fluxes in the middle. As a result, the magnetomotive force generated in the thin-film coil 110 can efficiently be used for recording.

Meanwhile, the following problems may occur in a thin-film magnetic head whose upper magnetic pole layer includes a magnetic pole part layer with a smaller width and a yoke part layer with a greater width connected to the upper face of the magnetic pole part layer in particular when the recording track width is smaller as described in the above-mentioned Patent Document 1, for example. First, since the cross-sectional area of the magnetic path drastically decreases in a connecting part between the magnetic pole part layer and yoke part layer, this part may be saturated with magnetic fluxes, whereby the magnetic fluxes may not fully be transmitted from the yoke part layer to the magnetic pole part layer. Therefore, overwrite characteristics may deteriorate in this thin-film magnetic head.

In the above-mentioned thin-film magnetic head whose upper magnetic pole layer includes the magnetic pole part layer and yoke part layer, magnetic fluxes may leak from the yoke part layer toward a recording medium, thereby generating so-called side writing in which the yoke part layer having a greater width writes data into an area of a recording medium other than the area to be recorded with the data, and so-called side erasing in which the yoke part layer erases data from an area where the data should not be erased. In any of these cases, the effective track width becomes greater than a desirable track width. The positional relationship between the magnetic pole part layer and yoke part layer is determined by alignment in photolithography, and thus may shift from a desirable positional relationship. In this case, side writing and side erasing may occur remarkably.

By contrast, the upper magnetic pole layer 55 defining the track width is a flat layer in the thin-film magnetic head 16, whereby the connecting part between the magnetic pole part layer and the yoke part layer is not saturated with magnetic fluxes. Therefore, the deterioration in overwrite characteristics and the above-mentioned side writing and side erasing do not occur in this embodiment.

Since the flat upper magnetic pole layer 55 is formed on a flat base, the track width defining part 55A of the upper magnetic pole layer 55 can be formed finely with a high precision in the thin-film magnetic head 16. This makes it possible to, realize a track width of 0.2 µm, which has conventionally been considered difficult when mass-producing thin-film magnetic heads.

Method of Manufacturing Thin-Film Magnetic Head

With reference to FIGS. 8A to 25B together with FIGS. 3 to 7B mentioned above, a method of manufacturing the thin-film magnetic head having the above-mentioned structure in accordance with the first embodiment will now be explained.

FIGS. 8A to 25A show respective cross sections taken along the line α—α of FIG. 4 in individual manufacturing steps. FIGS. 8B to 25B show respective cross sections of an opposing magnetic pole part parallel to the air bearing surface S.

First, in the method in accordance with this embodiment, an insulating layer 32 made of alumina ($Al_2O_3$), for example, is deposited by a thickness of about 2 to 5 µm on a substrate 31 made of aluminum oxide titanium carbide ($Al_2O_3$.TiC), for example, as shown in FIGS. 8A and 8B. Subsequently, a lower shield layer 33, made of a magnetic material (e.g., permalloy), for a reproducing head is deposited by a thickness of about 2 to 3 µm on the insulating layer 32. For example, the lower shield layer 33 is selectively formed on the insulating layer 32 by plating while using a photoresist film as a mask. Then, though not depicted, an insulating layer made of alumina, for example, is formed on the whole surface by a thickness of about 3 to 4 µm, for example, and thus formed insulating layer is polished by chemical mechanical polishing (hereinafter referred to as "CMP"), for example, until the lower shield layer 33 is exposed, thus flattening the surface.

Next, a lower shield gap film 34 as an insulating film is formed on the lower shield layer 33 by a thickness of about 20 to 40 nm, for example. Then, an MR device 35 is formed on the lower shield gap film 34 by a thickness of several tens of nanometers. The MR device 35 is formed by selectively etching the MR film formed by sputtering, for example. The MR device 35 is arranged near a position to be formed with an air bearing surface. Devices using magnetosensitive films exhibiting magnetoresistive effects such as AMR, GMR, and TMR (tunneling magnetoresistive) devices can be employed as the MR device 35.

Next, though not depicted, a pair of electrode layers electrically connected to the MR device 35 are formed on the lower shield gap film 34 by a thickness of several tens of nanometers. Further, on the lower shield gap film 34 and MR device 35, an upper shield gap film 37 as an insulating film is formed by a thickness of about 20 to 40 nm, for example, so that the MR device 35 is buried into the lower shield gap film 34 and upper shield gap film 37 (the boundary between the lower shield gap film 34 and upper shield gap film 37 being undepicted for convenience of illustration). Examples of insulating material used for the lower shield gap film 34 and upper shield gap film 37 include alumina, aluminum nitride, and diamond-like carbon (DLC). The lower shield gap film 34 and upper shield gap film 37 may be formed by sputtering or chemical vapor deposition (hereinafter referred to as "CVD").

Next, an upper shield layer 38, made of a magnetic material, for a reproducing head is selectively formed on the upper shield gap film 37 by a thickness of about 1.0 to 1.5 µm. Then, on the whole upper face of the laminate obtained by the foregoing steps, an insulating layer 39 made of alumina, for example, is formed by a thickness of about 0.3 µm, for example. Further, as the first magnetic pole layer in the present invention, a first magnetic pole part 40a constituting the lower magnetic pole layer 40 is formed by a thickness of 0.6 µm, for example, on the insulating layer 39.

In this case, the magnetic pole part 40a is formed by sputtering while using a highly saturated magnetic flux density material such as FeAlN, FeN, FeCo, CoFeN, and FeZrN as a material therefor. The first magnetic pole part 40a may also be formed by plating while using NiFe (Ni: 80 wt %; Fe: 20 wt %), NiFe (Ni: 45 wt %; Fe: 55 wt %) which is a highly saturated magnetic flux density material, or the like as a material. By way of example, a case where the first magnetic pole part 40a is formed by sputtering while using CoFeN with a saturated magnetic flux density of 2.4 T is assumed here.

Next, an insulating film 41 made of alumina, for example, is formed on the first magnetic pole part 40a by a thickness of 0.2 µm, for example. Subsequently, the insulating film 41 is selectively etched so as to form openings at positions where a second magnetic pole part 40b and a third magnetic pole part 40c are to be formed.

Then, though not depicted, an electrode film made of an electrically conductive material is formed by sputtering, for example, with a thickness of about 50 to 80 nm so as to cover the first magnetic pole part 40a and insulating film 41. This electrode film functions as an electrode and seed layer at the time of plating.

Further, though not depicted, a frame is formed on the electrode film by photolithography. This film is formed in order that first inner conductor parts 112, 114 constituting the thin-film coil 110 are provided by frame plating.

Next, as shown in FIGS. 9A and 9B, the electrode film is used for electroplating, so as to form a plating layer made of Cu (copper), for example. This plating layer and the undepicted electrode layer thereunder constitute the first inner conductor parts 112, 114. The first inner conductor parts 112, 114 have a thickness of 3.0 to 3.5 µm, for example. When forming the plating layer, individual rectangular end parts (represented by a rectangular end part 114b in the drawing) are also formed. Subsequently, the frame is removed, and then the electrode film is etched away by ion beam etching, for example, except for the parts located under the first inner conductor parts 112, 114 (including their rectangular end parts).

Then, though not depicted, a frame is formed on the first magnetic pole part 40a and insulating film 41 by photolithography. This frame is formed in order that the second magnetic pole part 40b and third magnetic pole part 40c are provided by frame plating.

Figure 10B:
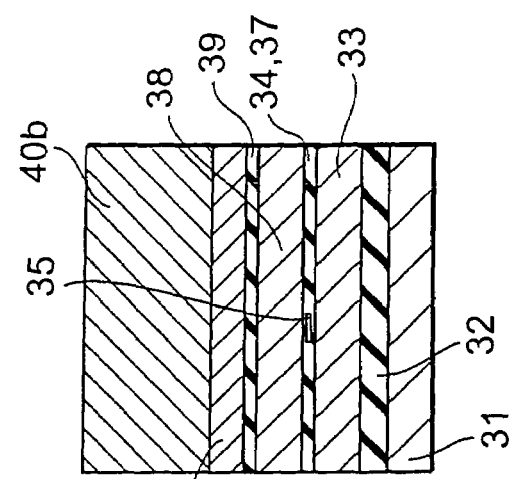
FIGS. 10A and 10B are sectional views showing a step subsequent to FIGS. 9A and 9B.
Figure 10A:
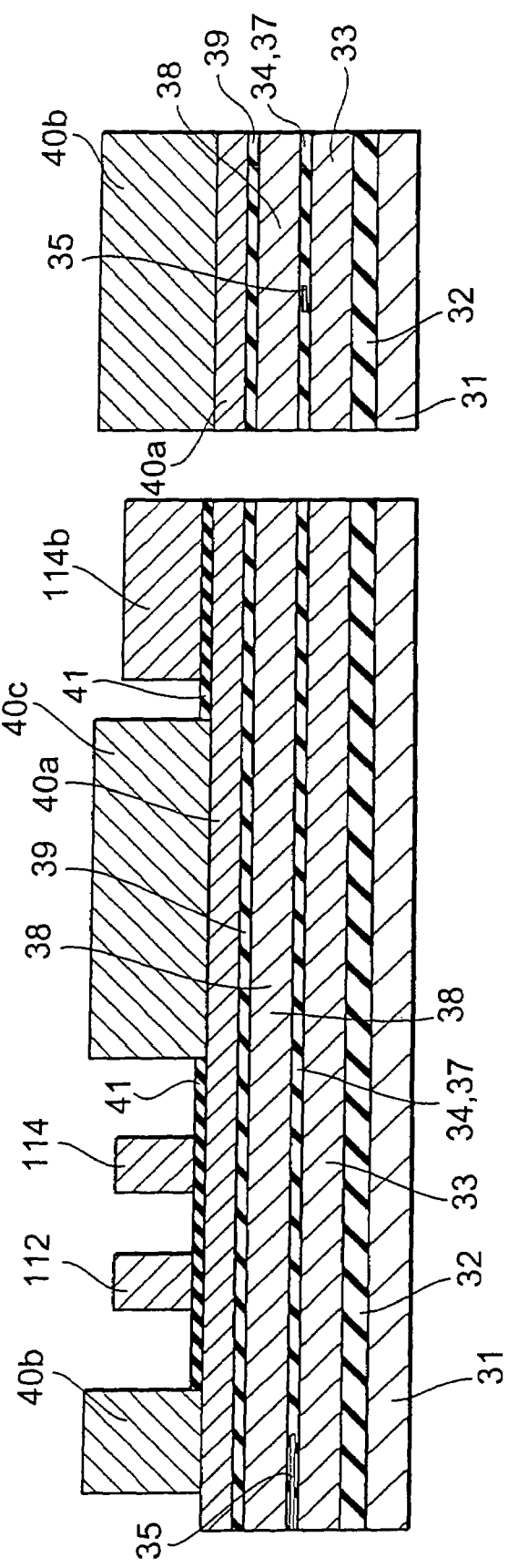

Subsequently, as shown in FIGS. 10A and 10B, electroplating is carried out so as to form the second magnetic pole part 40b, together with the third magnetic pole part 40c disposed at a position for determining the yoke length, as the second magnetic pole layer in the present invention by a thickness of 3.3 to 3.8 µm, for example, by using their respective magnetic materials. As materials for the second magnetic pole part 40b and third magnetic pole part 40c, highly saturated magnetic flux density materials are used, for example. For instance, CoNiFe with a saturated magnetic flux density of 2.1 T or FeCo, with a saturated magnetic flux density of 2.3 T can be used. When forming the second magnetic pole part 40b and third magnetic pole part 40c by electroplating in this embodiment, the unpatterned first magnetic pole part 40a is used as an electrode and seed layer for plating without providing a specific electrode film.

Further, as shown in FIGS. 11A and 11B, a photoresist 42 is formed so as to cover the first inner conductor parts 112, 114, second magnetic pole part 40b, and third magnetic pole part 40c. Next, while using the photoresist 42 as a mask, the first magnetic pole part 40a is selectively etched by ion beam etching, for example, so as to pattern the first magnetic pole part 40a.

As shown in FIGS. 12A and 12B, after the photoresist 42 is removed, a photoresist 43 for protecting the first inner conductor parts 112, 114 are disposed at positions where second inner conductor parts 111, 113, 115 are to be provided. The protective photoresist 43 is formed so as to fill at least the gap between the second magnetic pole part 40b and inner conductor part 112, the gap between the inner conductor parts 112 and 114, and the gap between the inner conductor part 114 and third magnetic pole part 40c. Further, an insulating layer 44 made of alumina is formed by a thickness of 4 to 6 µm, for example, so as to cover the whole upper face of thus formed laminate. Subsequently, the insulating layer 44 is polished by CMP, for example, until the protective photoresist 43 is exposed.

Subsequently, as shown in FIGS. 13A and 13B, the photoresist 43 is removed, and then a separation insulating film 45 made of alumina, for example, for separating the inner conductor parts from each other is formed by CVD, for example, so as to cover the whole upper face of the laminate. This forms a plurality of inner grooves, each covered with the separation insulating film 45, between the second magnetic pole part 40b and inner conductor part 112, between the inner conductor parts 112 and 114, and between the inner conductor part 114 and third magnetic pole part 40c. Here, the thickness of the separation insulating film 45 is not greater than that of the insulating film 41. Hence, the thickness of the separation insulating film 45 is preferably not greater than 0.2 µm, within the range of 0.08 to 0.15 µm in particular. For example, the separation insulating film 45 is a film formed by CVD such that $H_2O$, $N_2$, $N_2O$, or $H_2O_2$ as a material used for forming a thin film and $Al(CH_3)_3$ or $AlCl_3$ as a material used for forming a thin film are alternately emitted in an intermittent fashion at a temperature of 100° C. or less under reduced pressure. In this forming method, a plurality of thin alumina films are laminated, so that the separation insulating film 45 having a desirable thickness is obtained, whereby the inner conductor parts can reliably be insulated from each other while narrowing gaps therebetween.

The order of forming the protective photoresist 43, insulating layer 44, and separation insulating film 45 may be altered as follows: The first magnetic pole part 40a is patterned, the photoresist 42 is removed, and then the separation insulating film 45 is formed so as to cover the whole upper face of the laminate. Subsequently, the protective photoresist 43 and the insulating layer 44 are formed in succession, the insulating layer 44 is polished until the protective photoresist 43 is exposed, and then the protective photoresist 43 is removed. In this case, the separation insulating film 45 is formed before polishing the insulating layer 44, whereby the insulating layer 44 is polished while in a state where the first inner conductor parts 212, 114 are reinforced with the separation insulating film 45. This can prevent the inner conductor parts 112, 114 from being damaged or collapsed when polishing the insulating layer 44.

Figures 14A, 14B:
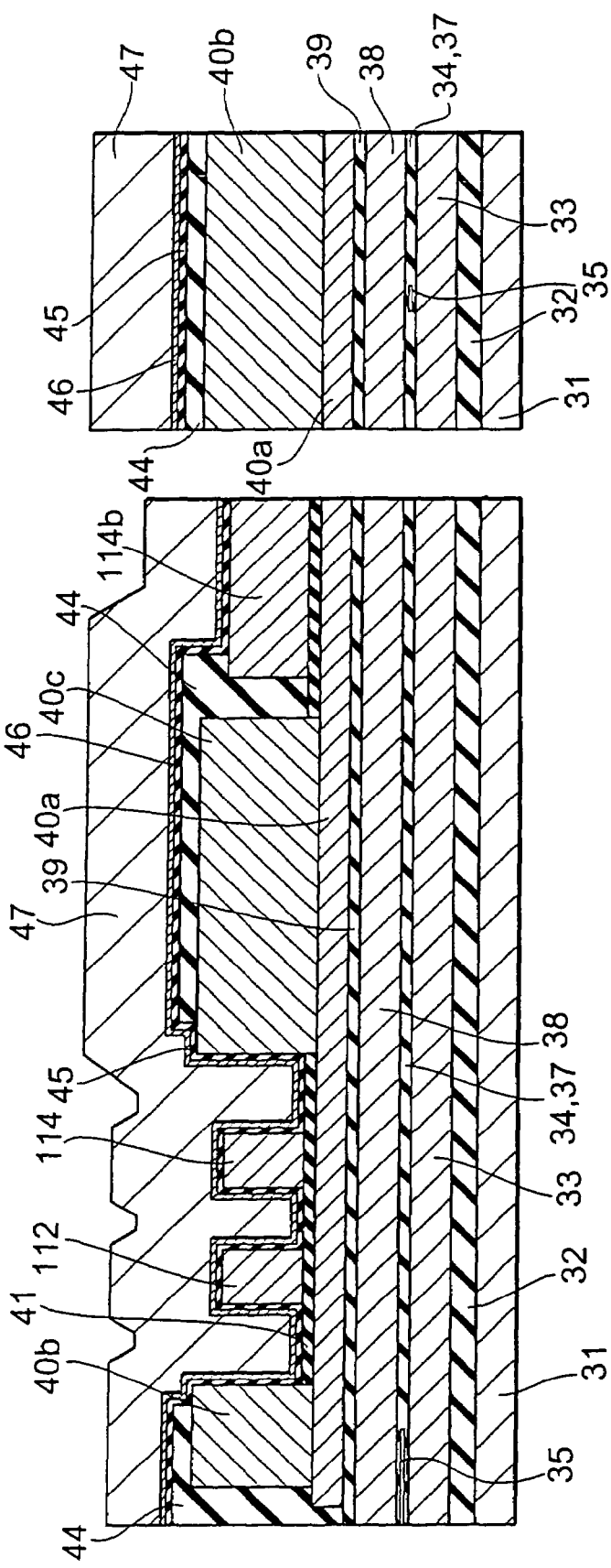
FIGS. 14A and 14B are sectional views showing a step subsequent to FIGS. 13A and 13B.

Next, in the following manner, second inner conductor parts 111, 113, 115 are formed at the respective inner grooves covered with the separation insulating film 45 as shown in FIGS. 14A and 14B.

Initially, a first electrically conductive film made of Cu constituting an electrode film 46 is formed by sputtering by a thickness of 30 to 50 nm, for example, so as to cover the whole upper face of the laminate. Subsequently, a second electrically conductive film made of Cu similarly constituting the electrode film 46 is formed on the first electrically conductive film by CVD by a thickness of 50 to 80 nm, for example. The second electrically conductive film is formed not for filling the individual inner grooves, i.e., those between the second magnetic pole part 40b and inner conductor part 112, between the inner conductor parts 112 and 114, and between the inner conductor part 114 and third conductor part 40c, but for covering the inner grooves while taking advantage of favorable step coverage of CVD. The first and second electrically conductive films constitute the electrode film 46. The electrode film 46 functions as an electrode and seed layer in plating which will be performed later.

Then, an electrically conductive layer 47 made of Cu, for example, is formed by plating on the electrode film 46 by a thickness of 4 to 5 µm, for example. The electrode film 46 and electrically conductive layer 47 are formed in order to provide the second inner conductor parts 111, 113, 115. Thus, in this embodiment, the second electrically conductive film made of Cu is formed by CVD, and the electrically conductive layer 47 made of Cu is formed on the second electrically conductive film by plating. In this manner, the electrically conductive layer 47 is reliably buried in the inner grooves, i.e., between the second magnetic pole part 40b and first inner conductor part 112, between the first inner conductor parts 112 and 114, and between the first inner conductor part 114 and third conductor part 40c.

Next, as shown in FIGS. 15A and 15B, the electrically conductive layer 47 is polished by CMP, for example, until the second magnetic pole part 40b, third magnetic pole part 40c, and first inner conductor parts 112, 114 are exposed. As a result of the polishing, the electrically conductive layer 47 and electrode film 46 remaining in the individual inner grooves, i.e., between the second magnetic pole part 40b and first inner conductor part 112, between the first inner conductor parts 112 and 114, and between the first inner conductor part 114 and third conductor part 40c form the second inner conductor parts 111, 113, 115. Thus obtained second inner conductor parts 111, 113, 115 and the above-mentioned first inner conductor parts 112, 114 form a first conductor group 116. Thus obtained second inner conductor parts 111, 113, 115 are buried in the respective inner grooves, and thus are arranged adjacent the first inner conductor parts 112, 114. Only the separation insulating film 45 exists between the second inner conductor parts 111, 113, 115 and their adjacent first inner conductor parts 112, 114. Therefore, the first inner conductor parts 112, 114 and the second inner conductor parts 111, 113, 115 form an insulating contact structure therebetween.

Then, as shown in FIGS. 16A and 16B, an insulating film 49 made of alumina, for example, is formed by a thickness of 0.2 µm, for example, so as to cover the whole upper face of the laminate Subsequently, in the insulating film 49, the parts corresponding to the second magnetic pole part 40b, third magnetic pole part 40c, and rectangular end parts of the inner conductor parts 111 to 115 are selectively etched away.

Next, on the second magnetic pole part 40b and third magnetic pole part 40c exposed by etching, a fourth magnetic pole part 40d and a fifth magnetic pole part 40e which constitute a second magnetic pole layer in this embodiment are formed by frame plating, for example, whereas respective first connecting part layers constituting lower connecting layers are formed on the rectangular end parts of the inner conductor parts 111 to 115. FIG. 16A shows a connecting part layer 48a formed on the rectangular end part 114b of the inner conductor part 114 among the first connecting part layers. Examples of materials employable for the fourth magnetic pole part 40d, fifth magnetic pole part 40e, and first connecting part layers include CoNiFe with a saturated magnetic flux density of 2.1 T and FeCo$_x$ with a saturated magnetic flux density of 2.3 T.

Next, an insulating layer 50 made of alumina, for example, is formed by a thickness of 2 to 3 μm so as to cover the whole upper face of the laminate. Then, the insulating layer 50 is polished by CMP, for example, until the fourth magnetic pole part 40d, fifth magnetic pole part 40e, and first connecting part layers are exposed.

Further, as shown in FIGS. 17A and 17B, a magnetic layer 51 is formed by sputtering by a thickness of 0.7 to 1.0 μm so as to cover the whole upper face of the laminate. An example of materials employable for the magnetic layer 51 is a highly saturated magnetic flux density material. For example, CoFeN with a saturated magnetic flux density of 2.4 T can be used.

Then, on the magnetic layer 51, etching masks 52a, 52b are formed in parts corresponding to the fourth magnetic pole part 40d and fifth magnetic pole part 40e, respectively. Etching masks are also formed in parts corresponding to a plurality of first connecting part layers. Among a plurality of etching masks corresponding to the respective first connecting part layers, an etching mask 52c corresponding to the connecting part layer 48a is shown in FIG. 17A. An example of materials employable for the etching masks is a metal material. The etching masks may be formed by plating, frame plating in particular. Magnetic materials different from those constituting the magnetic layer 51 may be used for the etching masks. As the magnetic materials, NiFe and CoNiFe may be used. The thickness of the etching masks is on the order of 1 to 2 μm, for example.

Figures 18A, 18B:
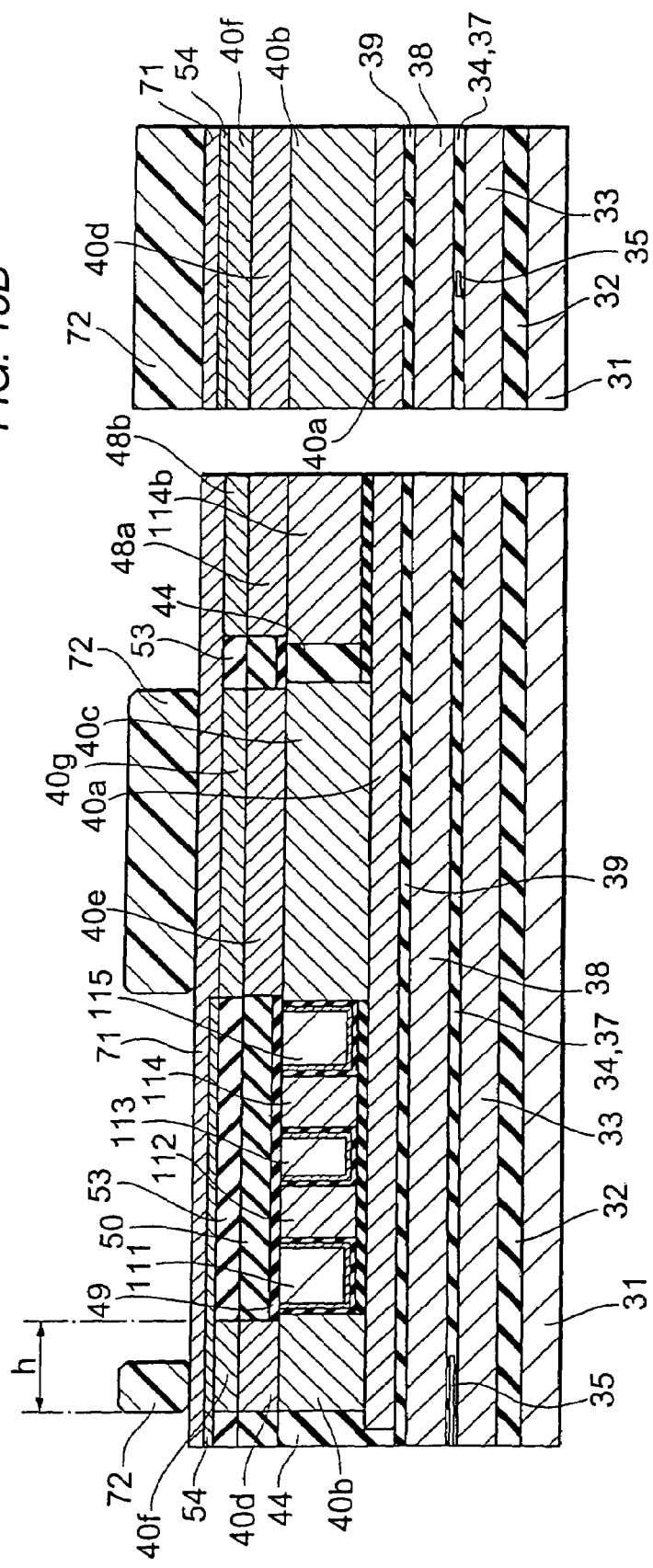
FIGS. 18A and 18B are sectional views showing a step subsequent to FIGS. 17A and 17B.

Next, while using the above-mentioned etching masks, ion beam etching or reactive ion etching (hereinafter referred to as "RIE") with a halogen type gas such as Cl$_2$ is carried out, so as to etch the magnetic layer 51 as shown in FIGS. 18A and 18B. Then, the parts of magnetic layer 51 left under the etching masks form a sixth layer 40f and a seventh layer 40g which constitute a third magnetic pole layer, and a plurality of second connecting part layers. Thus obtained sixth layer 40f and seventh layer 40g and the above-mentioned first magnetic pole part 40a, second magnetic pole part 40b, third magnetic pole part 40c, fourth magnetic pole part 40d, and fifth magnetic pole part 40e form the first magnetic pole group.

The second connecting layers, which constitute the lower connecting layers, are disposed on the first connecting part layers. Among the second connecting part layers, a second connecting part layer 48b disposed on the first connecting part layer 48a is shown in FIG. 18A.

Further, an insulating layer 53 made of alumina, for example, is formed by a thickness of 2 to 3 μm so as to cover the whole upper face of the laminate, and is polished by CMP, for example. The polishing removes the etching masks 52a, 52b, 52c (and the other etching masks corresponding to the first connecting part layers) and flattens the surfaces of the sixth magnetic pole part 40f, seventh magnetic pole part 40g, second connecting part layers, and insulating layer 53, whereas the insulating layer 53 is left at locations free of the sixth magnetic pole part 40f, seventh magnetic pole part 40g, and second connecting part layers. The polishing is carried out such that the sixth magnetic pole part 40f attains a thickness of 0.5 to 0.7 μm.

Here, the inner end part of the sixth magnetic pole part 40f away from the air bearing surface S gives the throat height of the recording head. The throat height refers to the distance (length) h from the end part on the air bearing surface S side to the end part on the opposite side (inner side) of a part where the two magnetic pole layers oppose each other across a recording gap layer, i.e., an opposing magnetic pole part.

Subsequently, a coating for forming a recording gap layer 54 is formed so as to cover the whole upper face of the laminate. The material for this coating may be either an insulating material such as alumina or a nonmagnetic metal material such as Ru, NiCu, Ta, W, Cr, Al$_2$O$_3$, and Si$_2$O$_3$. Assumed here is a case using Ru. In the coating, the parts disposed on the seventh magnetic pole part 40g and plurality of second connecting part layers are selectively etched away, so as to provide the recording gap layer 54.

Further, a magnetic layer 71 made of a magnetic material for forming a first magnetic pole part 55a is formed by sputtering, for example, so as to cover the whole upper face of the laminate. An example of materials employable for the magnetic layer 71 is a highly saturated magnetic flux density material. For example, CoFeN with a saturated magnetic flux density of 2.4 T can be used for the magnetic layer 71.

Next, a photoresist 72 is applied so as to cover the whole upper face of the laminate, and then is patterned so as to remain at predetermined areas. Using thus left parts of the photoresist 72, etching is carried out such that the parts of magnetic layer 71, recording gap layer 54, sixth magnetic pole part 40f, and insulating layer 53 not covered with the photoresist 72 are etched away. The part of magnetic layer 71 left by the etching will later form the first magnetic pole part 55a.

Further, as shown in FIGS. 19A and 19B, an insulating film 73 made of alumina is formed so as to cover the whole upper face of the laminate.

Then, as shown in FIGS. 20A and 20B, liftoff is carried out for removing the photoresist 72 together with the insulating film 73, and the surface is subsequently polished by CMP as appropriate.

Figure 21B:
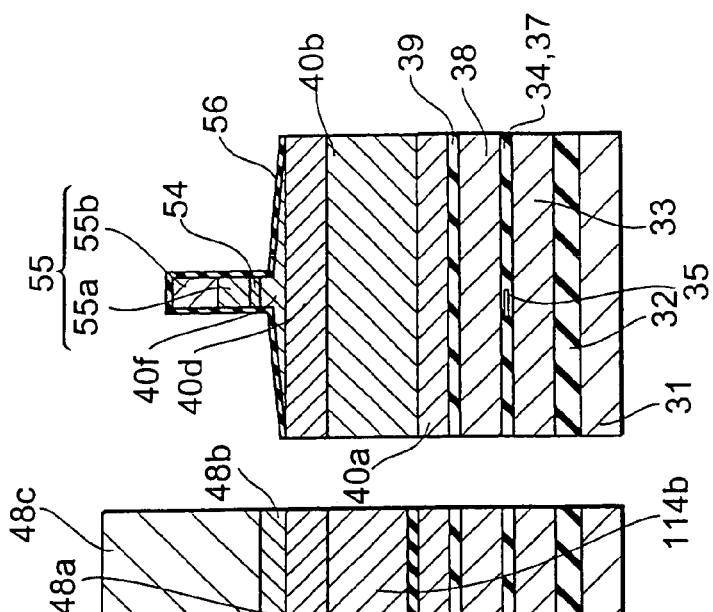
FIGS. 21A and 21B are sectional views showing a step subsequent to FIGS. 20A and 20B.
Figure 21A:
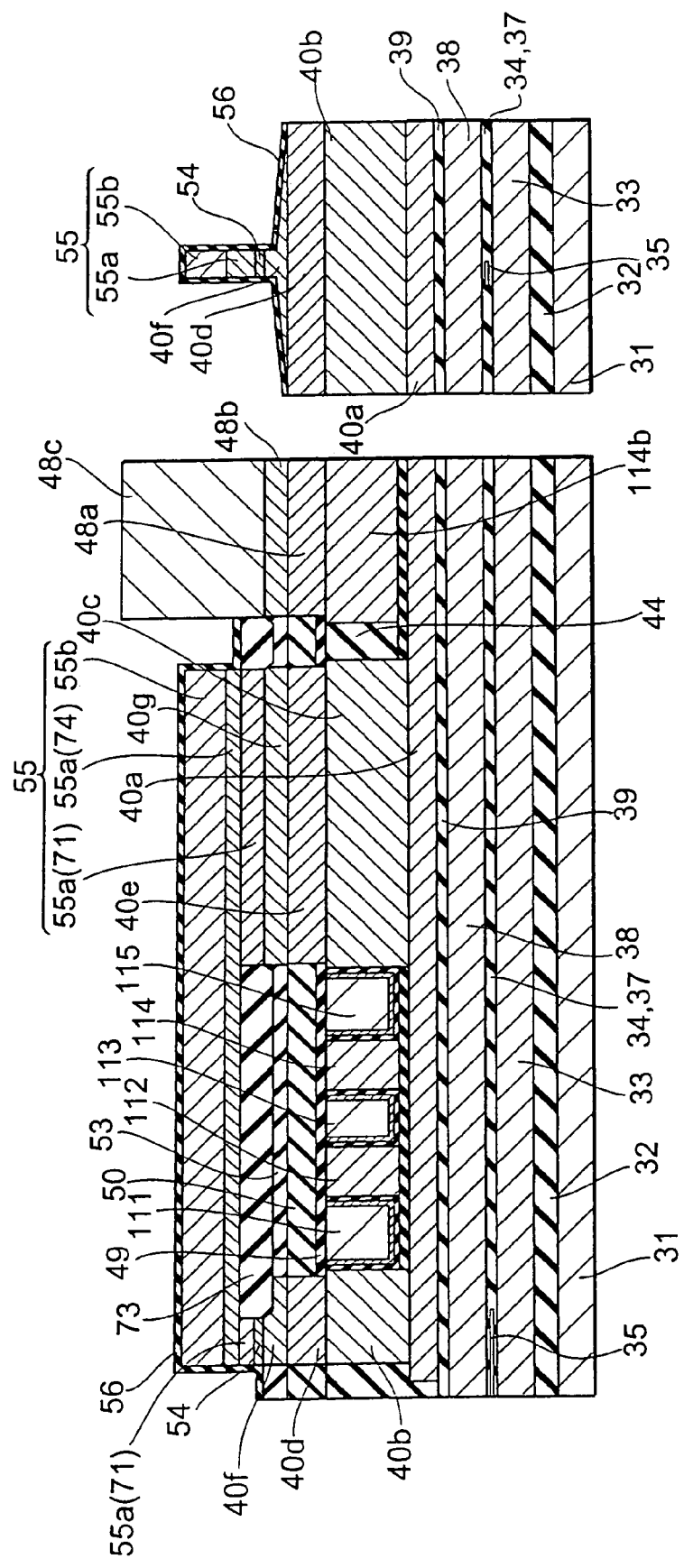

Further, as shown in FIGS. 21A and 21B, a magnetic layer 74 made of a magnetic material for forming the first magnetic pole part 55a is formed by sputtering, for example. Preferably, the magnetic layer 74 is formed from a highly saturated magnetic flux density material, e.g., CoFeN with a saturated magnetic flux density of 2.4 T. Subsequently, a second magnetic pole part 55b is formed on the magnetic layer 74 by frame plating, for example. It will, also be preferred if the second magnetic pole part 55b is formed from a highly saturated magnetic flux density material, e.g., CoFeN with a saturated magnetic flux density of 2.3 T. The second magnetic pole part 55b is disposed so as to extend from the position corresponding to the sixth magnetic pole part 40f to the position corresponding to the seventh magnetic pole part 40g.

Next, using the second magnetic pole part 55b as an etching mask, ion beam etching or RIE with a halogen type gas such as Cl$_2$ at a temperature of 200° C. to 250° C. is used for etching the magnetic layer 74. Then, the magnetic layer 74 coated with the second magnetic pole part 55b and left after etching forms the first magnetic pole part 55a. Thus, the second magnetic pole part 55b and first magnetic pole part 55a form an upper magnetic pole layer 55 on the lower magnetic pole layer 40.

Subsequently, though not depicted, a photoresist mask which opens in the vicinity of the track width defining part 55A (see FIG. 3,) is formed. Using the photoresist mask and upper magnetic pole layer 55 as a mask, ion beam etching or RIE, for example, is carried out for partly etching the recording gap layer 54 and sixth magnetic pole part 40f in the vicinity of the track width defining part 55A. This step forms a trimmed structure as shown in FIG. 21B.

Next, an insulating film 56 made of alumina, for example, is formed by a thickness of 0.2 to 0.5 μm so as to cover the whole upper face of the laminate. Subsequently, in the insulating film 56, the parts located on the plurality of second connecting part layers are selectively etched away. Further, by frame plating, third connecting part layers are formed as upper connecting layers on the second connecting part layers by a thickness of 1 to 2.5 μm, for example. Arranging the third connecting part layers on the second connecting part layers forms a connecting part group 130. An example of materials employable for the third connecting part layers is Cu. Among the plurality of third connecting part layers, a third connecting part layer 48c disposed on the second connecting part layer 48b is shown in FIG. 21A.

Then, as shown in FIGS. 22A and 22B, an insulating film 57 made of alumina, for example, is formed by a thickness of 2 to 3 μm so as to cover the whole upper face of the laminate. Subsequently, the insulating film 57 is polished by CMP, for example, until the plurality of third connecting part layers (represented by the third connecting part layer 48c in FIGS. 22A and 22B) are exposed. The first, second, and third connecting part layers 48a, 48b, 48c constitute individual connecting parts for connecting the inner and outer conductor parts. FIG. 22A shows a connecting part 138 for connecting the inner conductor part 114 to an outer conductor part 123 which will be formed later.

Next, first outer conductor parts 121, 122, 123 made of Cu, for example, are formed on the insulating layer 57 by a frame plating process similar to that used for the first inner conductor parts 112, 114, for example. Namely, an undepicted electrode film made of an electrically conductive material is formed on the insulating film 57 by a thickness of about 50 to 80 nm by sputtering, for example. Then, a frame is formed on the electrode film by photolithography. This frame is formed in order that first outer conductor parts 121, 122, 123 constituting the thin-film coil 110 are provided by frame plating. Further, electroplating is carried out while using the electrode film, so as to form a plating layer made of Cu (copper), for example. This plating layer and the undepicted electrode film thereunder constitute the first outer conductor parts 121, 122, 123. The first outer conductor parts 121, 122, 123 have a thickness of 3.0 to 3.5 μm for example. When forming the plating layer, an undepicted fourth connecting part layer is also formed on the third connecting part layer 48c corresponding to connecting parts 131, 132, 133 which correspond to the second outer conductor parts 124, 125. Subsequently, the frame is removed, and excessive parts of the electrode films are eliminated by ion beam etching, for example. Here, the farthest first outer conductor part 123 from the air bearing surface S is located on the air bearing surface S side from the link part 61.

Further, as shown in FIGS. 23A and 23B, a photoresist 75 is formed so as to cover the first outer conductor parts 121, 122, 123 and fourth connecting part layers. The parts of photoresist 75 excluding the vicinities of the first conductor parts 121, 122, 123 are selectively etched away by ion beam etching, for example, and an insulating layer 76 is laminated so as to cover the photoresist 75 and fourth connecting part layers.

Subsequently, as shown in FIGS. 24A and 24B, the insulating layer 76 is polished by CMP, for example, until the first outer conductor parts 121, 122, 123 and fourth connecting part layers are exposed. The polishing completes the forming of the first outer conductor parts 121, 122, 123 electrically insulated from each other. Namely, the first outer conductor parts 121, 122, 123 are disposed adjacent each other by way of the photoresist 75 and insulated from each other by the photoresist 75.

Next, as shown in FIGS. 25A and 25B, an insulating layer 77 made of alumina, for example, is formed by a thickness of 0.2 μm so as to cover the whole upper face of the laminate. Subsequently, in the insulating layer 77, the parts corresponding to the fourth connecting part layers are selectively etched away. Then, at predetermined positions on the insulating layer 77, second outer conductor parts 124, 125 made of Cu, for example, are formed on the insulating layer 77 by a frame plating process similar to that used for the first outer conductor parts 121, 122, 123, for example. More specifically, on the insulating layer 77, the second outer conductor part 124 is formed at a position corresponding to substantially the midpoint between the first outer conductor parts 121 and 122, whereas the second conductor part 125 is formed at a position corresponding to substantially the midpoint between the first outer conductor parts 122 and 123. The farthest second outer conductor part 125 from the air bearing surface S is formed so as to be located on the air bearing surface S side from the link part 61. Further, a photoresist 78 is formed so as to cover the second outer conductor parts 124, 125, and is selectively etched away from the areas excluding the vicinities of the second outer conductor parts 124, 125 by ion beam etching, for example.

When forming the plating layer, individual rectangular end parts are also formed. After removing the frame, the electrode films are etched away by ion beam etching, for example, except for the parts located under the second outer conductor parts 124, 125 (including their rectangular end parts). Here, the end parts 124b, 125a, 125b of second outer conductor parts 124, 125 are located on the fourth connecting part layers corresponding to the connecting parts 131, 132, 133, whereby the second outer conductor parts 124, 125 and their corresponding connecting parts 131, 132, 133 are electrically connected to each other.

Then, as shown in FIGS. 7A and 7B, an overcoat layer 26 made of alumina, for example, is formed by a thickness of 20 to 40 μm, for example, so as to cover the whole upper face of the laminate, and the surface of thus formed layer is flattened. Subsequently, an undepicted electrode pad is formed. Finally, a slider including the above-mentioned layers is polished, so as to form the air bearing surface S. As a result of the foregoing process, the first conductor group 116, second conductor group 120, and connecting part group 130 form the thin-film coil 110, whereby the thin-film magnetic head 16 is obtained.

A modified example of the structure of the above-mentioned thin-film magnetic head 16 will now be explained.

MODIFIED EXAMPLE

Figure 26:
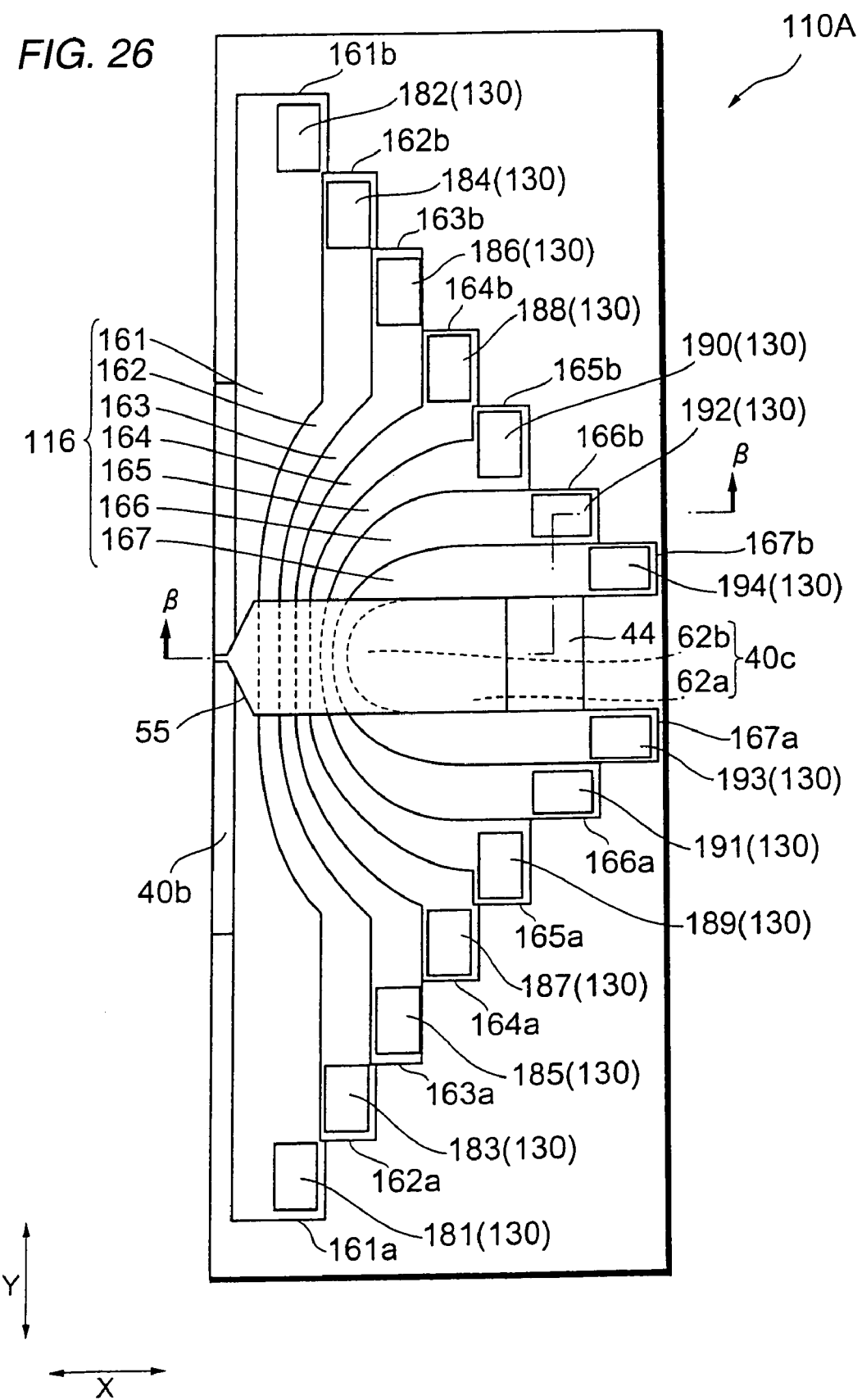
FIG. 26 is a plan view showing a first conductor group and individual connecting parts in the thin-film coil in accordance with a modified example.
Figure 27A:
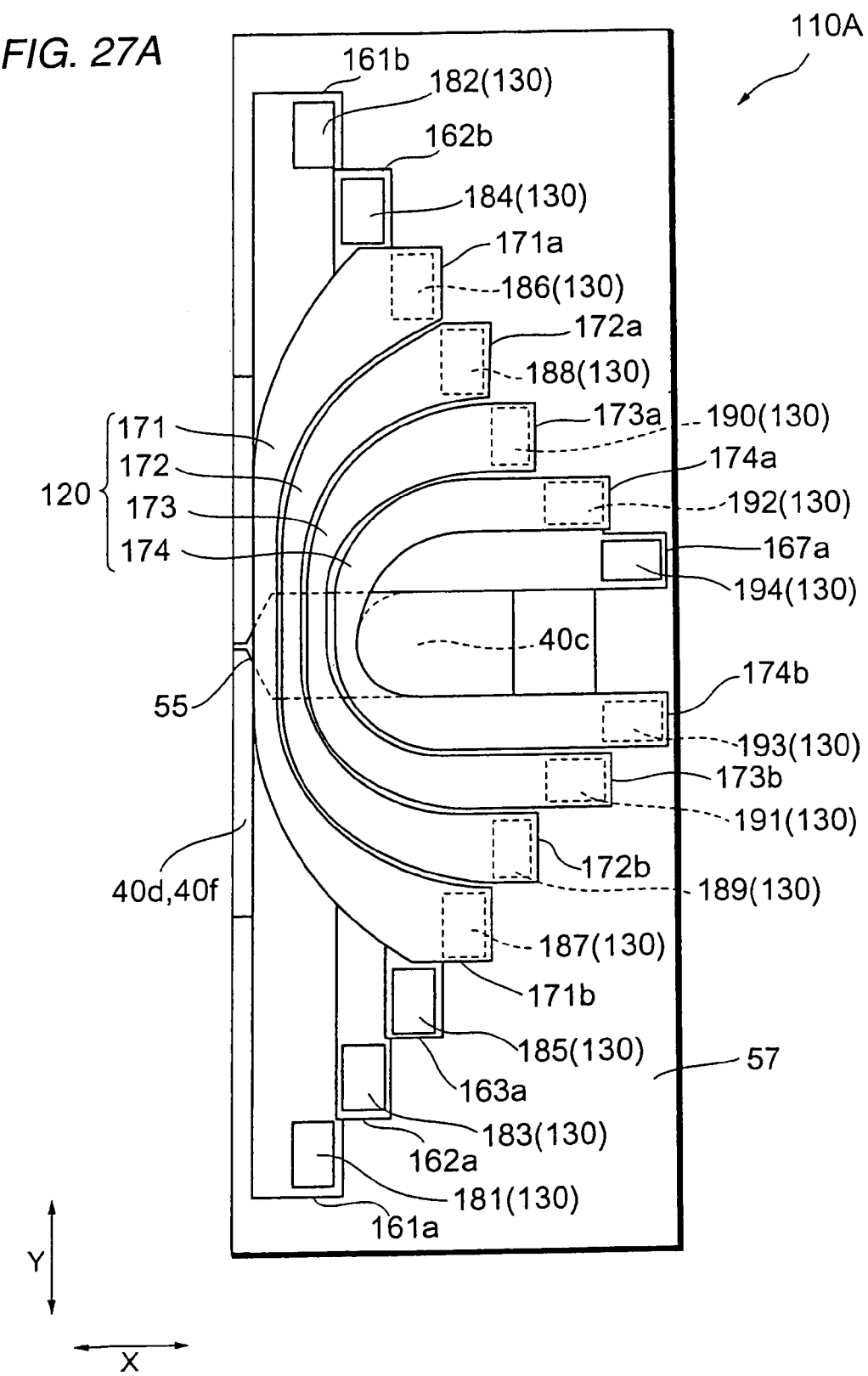
FIG. 27 is a plan view showing first outer conductor parts in a second conductor group of the thin-film coil in accordance with the modified example.
Figure 28:
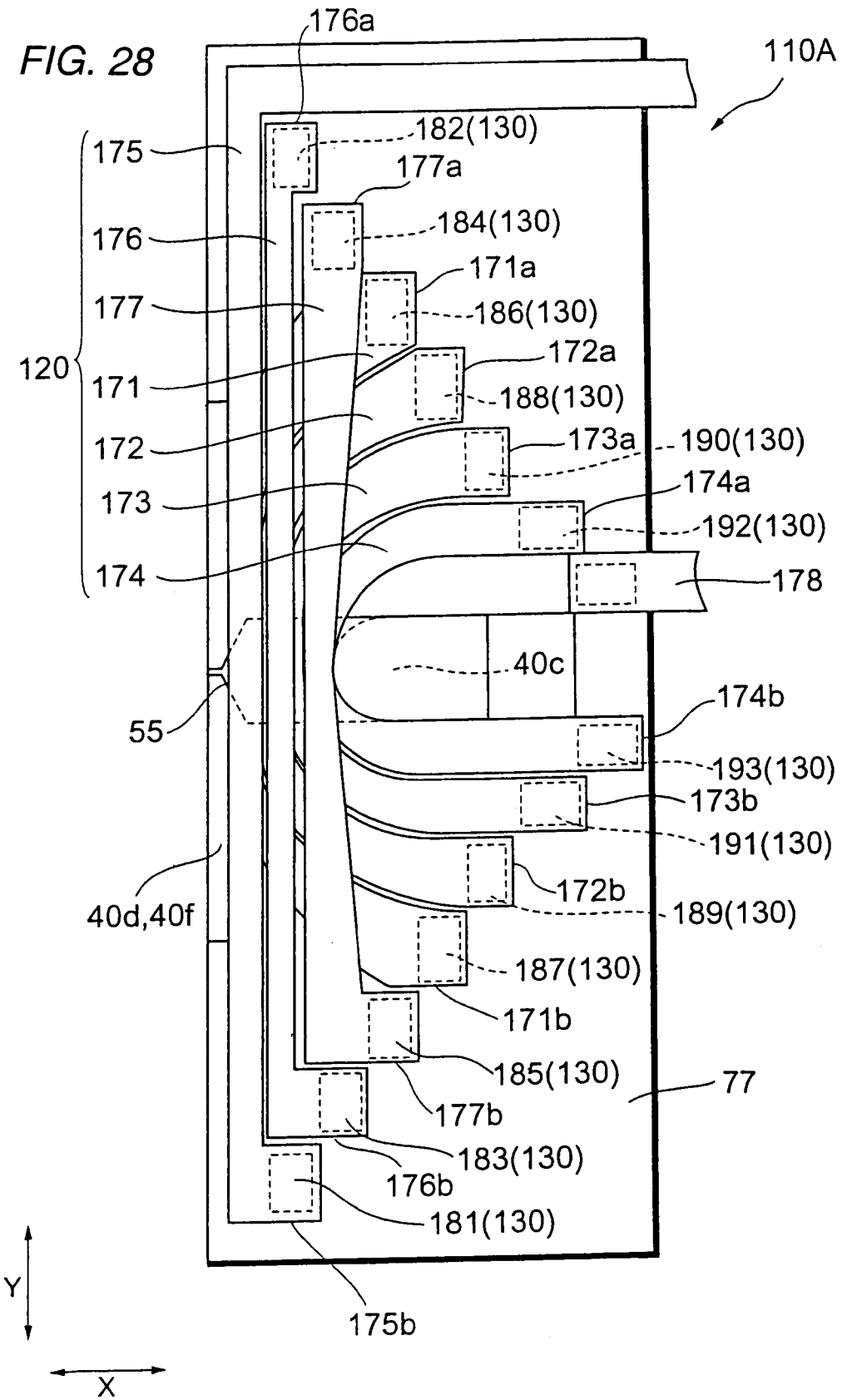
FIG. 28 is a plan view showing second outer conductor parts in the second conductor group.
Figures 30A, 30B:
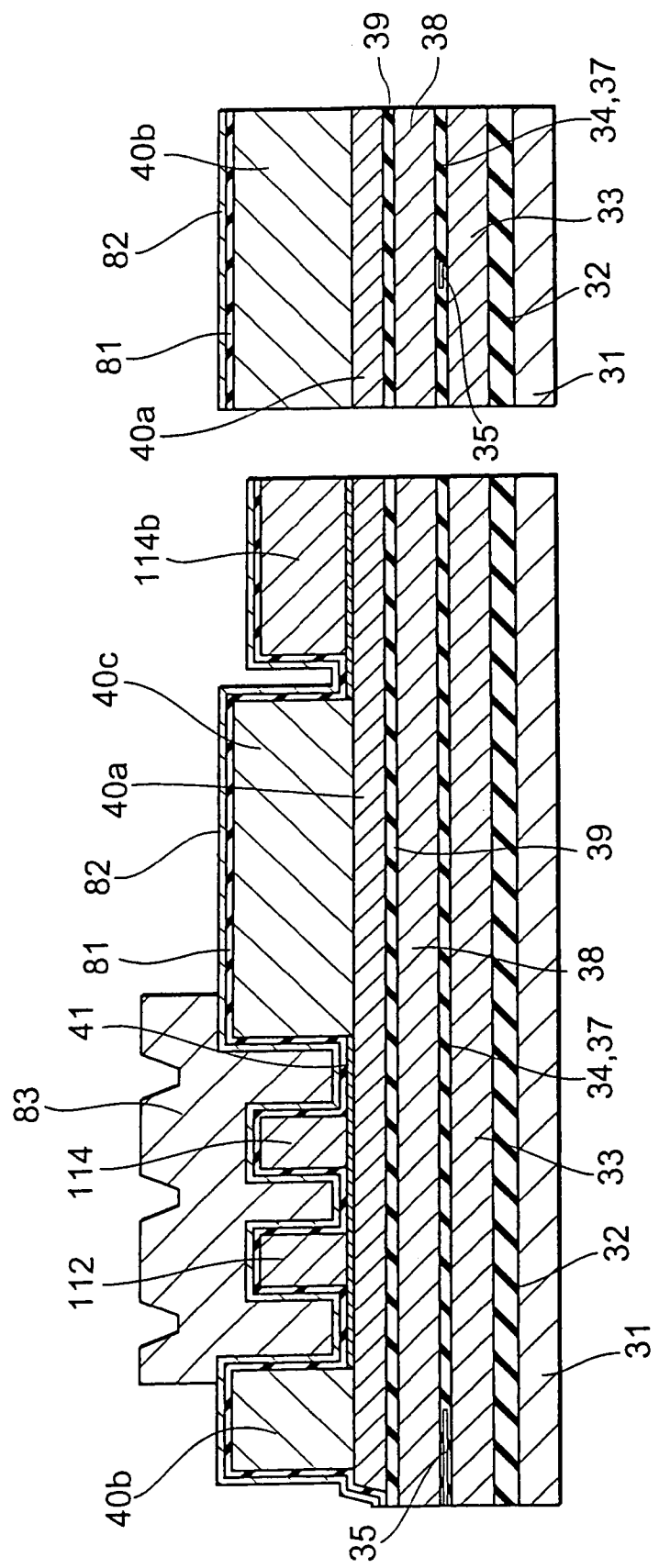
FIGS. 30A and 30B are sectional views showing a step in the process of manufacturing a thin-film magnetic head in accordance with a second embodiment.

The thin-film magnetic head 16A in accordance with the modified example is the same as the above-mentioned thin-film magnetic head 16 except for the configuration of the thin-film coil. Therefore, only their differences will be explained in the following, whereas their common features will be omitted or simplified. FIG. 26 is a plan view showing the first conductor group 116 and individual connecting parts in the thin-film coil 110A in accordance with the modified example. FIG. 27 is a plan view showing first outer conductor parts 171, 172, 173, 174 in the second conductor group 120 in the thin-film coil 110A in accordance with the modified example, whereas FIG. 28 is a plan view showing second outer conductor parts 175, 176, 177 in the second conductor group 120. FIG. 29A is a sectional view taken along the line β—β of FIG. 26, whereas FIG. 29B is a sectional view of an opposing magnetic pole part taken along a line parallel to the air bearing surface S.

As shown in FIGS. 26 to 29B, the thin-film coil 110 in the modified example comprises the first conductor group 116, second conductor group 120, and connecting part group 130, but differs from the thin-film coil 110 in that a series of 7-turn loops are formed. Namely, the first conductor group 116 comprises a plurality of inner conductor parts 161, 162, 163, 164, 165, 166, 167; the second conductor group 120 comprises a plurality of outer conductor parts 171, 172, 173, 174, 175, 176, 177; and the connecting part group 130 comprises a plurality of connecting parts 181, 182, 183, 184, 185, 186, 187, 188, 189, 190, 191, 192, 193, 194; whereby the thin-film coil forms 7-turn helical loops in total. The second conductor group 120 has a two-stage configuration composed of the first outer conductor parts 171, 172, 173, 174 on the lower stage and the second outer conductor parts 175, 176, 177 on the upper stage in the thin-film coil in accordance with this modified example as well. The other points are the same as those of the above-mentioned thin-film coil 110 and thus will not be explained in detail.

Since the second conductor group (outer conductor part) 120 has a two-stage configuration composed of the first outer conductor parts 171, 172, 173, 174 and second outer conductor parts 175, 176, 177, this thin-film coil can also make the total width W3 of the second conductor group 120 (see FIG. 29A) shorter than that in the conventional magnetic head having one stage of outer conductor parts and the same number of turns of the thin-film coil. Therefore, the magnetic head 16 can significantly reduce the yoke length while keeping magnetic fluxes used for recording, and thus is adaptable to higher frequencies.

As explained in detail in the foregoing, the yoke length is significantly reduced in the magnetic head 16 in accordance with this embodiment of the present invention, whereby recording characteristics in high frequency bands are improved. It is needless to mention that recording characteristics in high frequency bands are improved in the head gimbal assembly 12 and hard disk drive 10 employing this magnetic head 16.

SECOND EMBODIMENT

The method of manufacturing a thin-film magnetic head in accordance with a second embodiment of the present invention will now be explained with reference to FIGS. 30A to 32B.

The method in accordance with this embodiment is the same as that in accordance with the first embodiment up to the step in which the first magnetic pole part 40a is patterned while using the photoresist 42 as a mask as shown in FIGS. 11A and 11B. In subsequent steps, the method in accordance with the second embodiment differs from that in accordance with the first embodiment. The following explanation will be focused on points different from those in the method in accordance with the first embodiment, while omitting or simplifying their common points.

Subsequently to the step shown in FIGS. 11A and 11B, a separation insulating film 81 made of alumina, for example, is formed by CVD, for example, so as to cover the whole upper face of the laminate. This forms a plurality of inner grooves covered with the separation insulating film 81 between the second magnetic pole part 40b and inner conductor part 112, between the inner conductor parts 112 and 114, and between the inner conductor part 114 and third magnetic pole part 40c. The thickness of the separation insulating film 81 is smaller than that of the insulating film 41. Therefore, the thickness of the separation insulating film 81 is preferably 0.2 µm or smaller, within the range of 0.08 to 0.15 µm in particular. The separation insulating film 81 is formed by a method similar to that used for the separation insulating film 45.

Subsequently, in the following manner, an electrode film 82 is formed by sputtering so as to cover the whole upper face of the laminate. Initially, a first electrically conductive film made of Cu is formed by a thickness of 30 to 50 nm, for example, by sputtering. Further, a second electrically conductive film made of Cu is formed on the first electrically conductive film by CVD by a thickness of 50 to 80 nm, for example. The second electrically conductive film is formed not for filling the individual inner grooves, i.e., those between the second magnetic pole part 40b and inner conductor part 112, between the inner conductor parts 112 and 114, and between the inner conductor part 114 and third conductor part 40c, but for covering the inner grooves while taking advantage of favorable step coverage of CVD. The first and second electrically conductive films constitute the electrode film 82. The electrode film 82 functions as an electrode and seed layer in plating which will be performed later.

Then, an electrically conductive layer 83 made of Cu, for example, is formed on the electrode film 82 by plating by a thickness of 4 to 5 µm, for example. The electrically conductive layer 83 is used for providing second inner conductor parts 111, 113, 115, and are formed in areas where the second inner conductor parts 111, 113, 115 are to be arranged.

Next, using the electrically conductive layer 83 as a mask, the electrode film 82 is etched away except for the part located under the electrically conductive layer 83 as shown in FIGS. 31A and 31B. The electrode film 82 may be removed by ion beam etching in which the angle formed between the ion beam advancing direction and a direction perpendicular to the upper face of the first magnetic pole part 40a falls within the range of 45° to 75°. Alternatively, the electrode film 82 may be removed by wet etching with dilute hydrochloric acid, dilute sulfuric acid, or dilute nitric acid or electrolytic etching with a copper sulfate solution in order that the electrode film 82 formed on a stepped surface can completely be eliminated.

Then, an insulating film 84 made of alumina, for example, is formed by a thickness of 4 to 6 µm, for example, so as to cover the whole upper face of the laminate. Further, as shown in FIGS. 32A and 32B, the insulating film 84 is polished by CMP, for example, until the second magnetic pole part 40b, third magnetic pole part 40c, and first inner conductor parts 112, 114 are exposed. The polishing forms the second inner conductor parts 111, 113, 115 such that the electrically conductive layer 83 and electrode film 82 are buried between the second magnetic pole part 40b and first inner conductor part 112, between the first inner conductor parts 112 and 114, and between the first inner conductor part 114 and third magnetic pole part 40c. Thus obtained second inner conductor parts 111, 113, 115 and already formed first inner conductor parts 112, 114 form the first conductor group 116. The resulting second inner conductor parts 111, 113, 115 are buried in the respective inner grooves and thus are arranged adjacent the first inner conductor parts 112, 114. Since only the separation insulating film 81 exists between the second inner conductor parts 111, 113, 115 and their adjacent first inner conductor parts 112, 114, the first inner conductor parts 112, 114 and second inner conductor parts 111, 113, 115 form an insulating contact structure therebetween. The foregoing steps yield a state similar to that in the previously mentioned method (see FIGS. 15A and 15B). Thereafter, a method similar to that in accordance with the first embodiment is used for manufacturing a thin-film magnetic head.

Thus made thin-film magnetic head in accordance with this embodiment has the same structure as that of the thin-film magnetic head 16 in accordance with the first embodiment. Therefore, the thin-film magnetic head in accordance with this embodiment exhibits operations and effects identical to those of the thin-film magnetic head in accordance with the first embodiment.

OTHER MODIFIED EXAMPLES

Without being restricted to the above-mentioned embodiments, the present invention can be modified as appropriate. For example, though the thin-film coil 110 is set to 5 or 7 turns, other numbers of turns can be selected for the thin-film coil.

Also, a thin-film coil having a desirable number of turns can be made by using a semi-finished product (thin-film magnetic head base structure) in which at least the members up to the first conductor group have been produced. In this case, the number of turns of the thin-film coil may be selected by changing both the form of the connecting parts and the number of outer conductor parts.

Further, the present invention is applicable to a write-only head having an inductive electromagnetic transducer alone, and a thin-film magnetic head which carries out both recording and reproducing by using an inductive electromagnetic transducer.

Though each of the above-mentioned embodiments relates to a longitudinal recording head comprising upper and lower magnetic pole layers as an example of a thin-film magnetic head, the present invention is not limited to longitudinal recording heads. The present invention is also applicable to vertical recording heads comprising a main magnetic pole layer and an auxiliary magnetic pole layer.

It is clear that various modes and modified examples of the present invention can be carried out according to, the foregoing explanations. Therefore, within the scope equivalent to that of the following claims, the present invention can be carried out in modes other than the above-mentioned best modes.

What is claimed:

1. A magnetic head comprising:
   first and second magnetic pole layers having respective magnetic pole parts opposing each other by way of a gap layer on a side of a medium-opposing surface opposing a recording medium;
   a link part for magnetically linking the first and second magnetic pole layers; and
   a thin-film coil helically wound about at least one of the first and second magnetic pole layers while being insulated from the first and second magnetic pole layers;
   the thin-film coil comprising:
   a plurality of generally coplanar inner conductor parts, located on the medium-opposing surface side from the link part between the first and second magnetic pole layers, extending in a direction intersecting the first or second magnetic pole layer while in parallel with each other with an insulating film interposed therebetween;
   a plurality of first outer conductor parts, located on a side of the first or second magnetic pole layer opposite from the side where the inner conductor parts are located, extending along the inner conductor part extending direction;
   a plurality of second outer conductor parts, located on a side of the first outer conductor parts opposite from the side where the inner conductor parts are located, extending along the inner conductor part extending direction; and
   a plurality of connecting parts for connecting each of the first and second outer conductor parts to a corresponding inner conductor part.

2. A magnetic head according to claim 1, wherein the first and second outer conductor parts are located on the medium-opposing surface side from the link part.

3. A magnetic head according to claim 2, wherein the link part is shaped like a pillar having a cross-sectional form projecting toward the medium-opposing surface; and
   wherein the inner conductor parts have a width minimized on a virtual line extending from a leading end of the projecting part of the link part to the medium-opposing surface, and the virtual line extending along the normal line of the medium-opposing surface, the width becoming greater as the inner conductor parts are farther from the virtual line.

4. A magnetic head according to claim 1, wherein the distance between adjacent inner conductor parts among the plurality of inner conductor parts is substantially the same as the thickness of the insulating film.

5. A magnetic head according to claim 1, wherein the distance between adjacent outer conductor parts among the plurality of first outer conductor parts is wider than the distance between adjacent inner conductor parts among the plurality of inner parts.

6. A magnetic head according to claim 1, wherein the smallest width of the first outer conductor parts is greater than the smallest width of the inner conductor parts.

7. A magnetic head according to claim 1, wherein the connecting parts are shaped like a pillar having a rectangular cross section; and wherein adjacent connecting parts among the plurality of connecting parts align in a diagonal direction of the rectangular cross section.

8. A head gimbal assembly comprising a support, a magnetic head formed on the support, a gimbal for securing the support, and a load beam connected to the gimbal;
   the magnetic head comprising first and second magnetic pole layers having respective magnetic pole parts opposing each other by way of a gap layer on a medium-opposing surface side, a link part for magnetically linking the first and second magnetic pole layers, and a thin-film coil helically wound about at least one of the first and second magnetic pole layers while being insulated from the first and second magnetic pole layers;
   the thin-film coil comprising:
   a plurality of generally coplanar inner conductor parts, located on the medium-opposing surface side from the link part between the first and second magnetic pole layers, extending in a direction intersecting the first or second magnetic pole layer while in parallel with each other with an insulating film interposed therebetween;
   a plurality of first outer conductor parts, located on a side of the first or second magnetic pole layer opposite from the side where the inner conductor parts are located, extending along the inner conductor part extending direction;
   a plurality of second outer conductor parts, located on a side of the first outer conductor parts opposite from the side where the inner conductor parts are located, extending along the inner conductor part extending direction; and a plurality of connecting parts for connecting each of the first and second outer conductor parts to a corresponding inner conductor part.

9. A hard disk drive comprising a support, a magnetic head formed on the support, and a recording medium opposing the magnetic head;

the magnetic head comprising first and second magnetic pole layers having respective magnetic pole parts opposing each other by way of a gap layer on a medium-opposing surface side, a link part for magnetically linking the first and second magnetic pole layers, and a thin-film coil helically wound about at least one of the first and second magnetic pole layers while being insulated from the first and second magnetic pole layers; p1 the thin-film coil comprising:

a plurality of generally coplanar inner conductor parts, located on the medium-opposing surface side from the link part between the first and second magnetic pole layers, extending in a direction intersecting the first or second magnetic pole layer while in parallel with each other with an insulating film interposed therebetween;

a plurality of first outer conductor parts, located on a side of the first or second magnetic pole layer opposite from the side where the inner conductor parts are located, extending along the inner conductor part extending direction;

a plurality of second outer conductor parts, located on a side of the first outer conductor parts opposite from the side where the inner conductor parts are located, extending along the inner conductor part extending direction; and a plurality of connecting parts for connecting each of the first and second outer conductor parts to a corresponding inner conductor part.

10. A method of manufacturing a magnetic head, the method being employed for manufacturing a magnetic head comprising first and second magnetic pole layers having respective magnetic pole parts opposing each other by way of a gap layer on a medium-opposing surface side, a link part for magnetically linking the first and second magnetic pole layers, and a thin-film coil helically wound about at least one of the first and second magnetic pole layers while being insulated format he first and second magnetic pole layers;

the method comprising:
a step of forming the first magnetic pole layer;
a step of forming the gap layer on the first magnetic pole layer;
a step of forming the second magnetic pole layer on the gap layer;
a step of forming the link part; and
a step of forming the thin-film coil;
the step of forming the thin-film coil comprising the steps of forming:
a plurality of generally coplanar inner conductor parts, located on the medium-opposing surface side from the link part between the first and second magnetic pole layers, extending in a direction intersecting the first or second magnetic pole layer while in parallel with each other with an insulating film interposed therebetween;
a plurality of first outer conductor parts, located on a side of the first or second magnetic pole layer opposite from the side where the inner conductor parts are located, extending along the inner conductor part extending direction;
a plurality of second outer conductor parts, located on a side of the first outer conductor parts opposite from the side where the inner conductor parts are located, extending along the inner conductor part extending direction; and
a plurality of connecting parts for connecting each of the first and second outer conductor parts to a corresponding inner conductor part;
each constituting the thin-film coil.

11. A method of manufacturing a magnetic head according to claim 10, wherein the first and second outer conductor parts are located on the medium-opposing surface side from the link part.

12. A method of manufacturing a magnetic head according to claim 10, wherein the inner conductor parts are aligned inside a layer.

13. A method of manufacturing a magnetic head according to claim 10, wherein the thin film coil has an insulating contact structure.

14. A hard disk drive according to claim 9, wherein the thin film coil has an insulating contact structure.

15. A hard disk drive according to claim 9, wherein the inner conductor parts are aligned inside a layer.

16. A head gimbal assembly according to claim 8, wherein the thin film coil has an insulating contact structure.

17. A head gimbal assembly according to claim 8, wherein the inner conductor parts are aligned inside a layer.

18. A magnetic head according to claim 1, wherein the inner conductor parts are aligned inside a layer.

19. A magnetic head according to claim 1, wherein the thin film coil has an insulating contact structure.

* * * * *